(12) United States Patent
Kitajima

(10) Patent No.: US 10,009,588 B2
(45) Date of Patent: Jun. 26, 2018

(54) IMAGE PROCESSING APPARATUS AND IMAGING APPARATUS

(71) Applicant: CANON KABUSHIKI KAISHA, Tokyo (JP)

(72) Inventor: Kotaro Kitajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/104,910

(22) PCT Filed: Dec. 11, 2014

(86) PCT No.: PCT/JP2014/083491
§ 371 (c)(1),
(2) Date: Jun. 15, 2016

(87) PCT Pub. No.: WO2015/098669
PCT Pub. Date: Jul. 2, 2015

(65) Prior Publication Data
US 2016/0316187 A1    Oct. 27, 2016

(30) Foreign Application Priority Data

Dec. 26, 2013 (JP) .................................. 2013-269396
Dec. 26, 2013 (JP) .................................. 2013-269407

(51) Int. Cl.
*H04N 9/73* (2006.01)
*H04N 5/228* (2006.01)
(Continued)

(52) U.S. Cl.
CPC ................. *H04N 9/69* (2013.01); *G09G 5/02* (2013.01); *H04N 1/6027* (2013.01); *H04N 5/04* (2013.01);
(Continued)

(58) Field of Classification Search
CPC .......... H04N 5/04; H04N 5/372; H04N 5/374; H04N 5/202; H04N 9/69; H04N 1/6027;
(Continued)

(56) References Cited

U.S. PATENT DOCUMENTS 6,111,980 A * 8/2000 Sano .................... H04N 5/2353
348/223.1
7,046,400 B2 * 5/2006 Gindele ................ H04N 1/407
358/1.9

(Continued)

FOREIGN PATENT DOCUMENTS

EP       2800352 A1    11/2014
JP       07-254988 A   10/1995
(Continued)

OTHER PUBLICATIONS

International Search Report of International Application No. PCT/US2014/083491 dated Mar. 20, 2015.
(Continued)

*Primary Examiner* — Lin Ye
*Assistant Examiner* — John H Morehead, III
(74) *Attorney, Agent, or Firm* — Cowan, Liebowitz & Latman, P.C.

(57) ABSTRACT

To allow re-producing, in another image processing apparatus, contents of image processing in an image processing apparatus, a provisional color grading apparatus 300 determines normalizing points (CodeValues that serve as references for normalizing) of input image signals according to format information and normalizes the input image signals. The provisional color grading apparatus 300 records values (normalizing information) obtained by converting the normalizing points into numerical values independent of devices, in association with parameters of color grading.

13 Claims, 19 Drawing Sheets

(51) Int. Cl.
*H04N 9/69* (2006.01)
*G09G 5/02* (2006.01)
*H04N 5/202* (2006.01)
*H04N 1/60* (2006.01)
*H04N 5/04* (2006.01)
*H04N 5/372* (2011.01)
*H04N 5/374* (2011.01)

(52) U.S. Cl.
CPC ............ *H04N 5/202* (2013.01); *H04N 5/372* (2013.01); *H04N 5/374* (2013.01); *G09G 2320/0276* (2013.01); *H04N 2201/3228* (2013.01); *H04N 2201/3256* (2013.01); *H04N 2209/04* (2013.01)

(58) Field of Classification Search
CPC ... H04N 2201/3228; H04N 2201/3256; H04N 2209/04; G09G 5/02
See application file for complete search history.

(56) References Cited

U.S. PATENT DOCUMENTS

| | | | |
|---|---|---|---|
| 8,077,229 B2 | 12/2011 | Shinkai et al. | |
| 8,928,686 B2 | 1/2015 | Messmer | |
| 9,111,330 B2 | 8/2015 | Messmer et al. | |
| 9,420,196 B2* | 8/2016 | Atkins | H04N 5/235 |
| 2004/0066979 A1* | 4/2004 | Gindele | G06K 9/40 |
| | | | 382/274 |
| 2004/0201740 A1* | 10/2004 | Nakamura | G06F 17/30265 |
| | | | 348/231.3 |
| 2004/0247165 A1* | 12/2004 | Nishiura | G06T 7/0012 |
| | | | 382/128 |
| 2008/0013850 A1* | 1/2008 | Sakurai | G06T 5/50 |
| | | | 382/255 |
| 2009/0015687 A1 | 1/2009 | Shinkai et al. | |
| 2011/0129148 A1* | 6/2011 | Kisilev | G06T 5/009 |
| | | | 382/167 |
| 2011/0187733 A1* | 8/2011 | Sun | G09G 3/3406 |
| | | | 345/589 |
| 2011/0254976 A1* | 10/2011 | Garten | G06F 3/1454 |
| | | | 348/229.1 |
| 2012/0218442 A1* | 8/2012 | Jandhyala | G06T 5/50 |
| | | | 348/239 |
| 2013/0076763 A1 | 3/2013 | Messmer | |
| 2013/0076974 A1* | 3/2013 | Atkins | H04N 5/235 |
| | | | 348/362 |
| 2013/0223733 A1* | 8/2013 | Tripathi | H04N 1/60 |
| | | | 382/167 |
| 2014/0078165 A1 | 3/2014 | Messmer et al. | |
| 2015/0103091 A1 | 4/2015 | Messmer | |
| 2015/0222792 A1 | 8/2015 | Ogikubo | |
| 2015/0281707 A1 | 10/2015 | Messmer et al. | |

FOREIGN PATENT DOCUMENTS

| | | |
|---|---|---|
| JP | 2000-278530 A | 10/2000 |
| JP | 2001-086356 A | 3/2001 |
| JP | 2003-289467 A | 10/2003 |
| JP | 2009-021827 A | 1/2009 |
| WO | 2012/166382 A2 | 12/2012 |
| WO | 2013/099118 A1 | 7/2013 |

OTHER PUBLICATIONS

Foreign patent documents were cited in the Jan. 23, 2018 Japanese Office Action, enclosed without an English Translation, that issued in Japanese Patent Application No. 2013269396.
The above foreign patent documents were cited in the Apr. 10, 2018 Japanese Office Action, which is enclosed without an English Translation, that issued in Japanese Patent Application No. 2013269396.

* cited by examiner

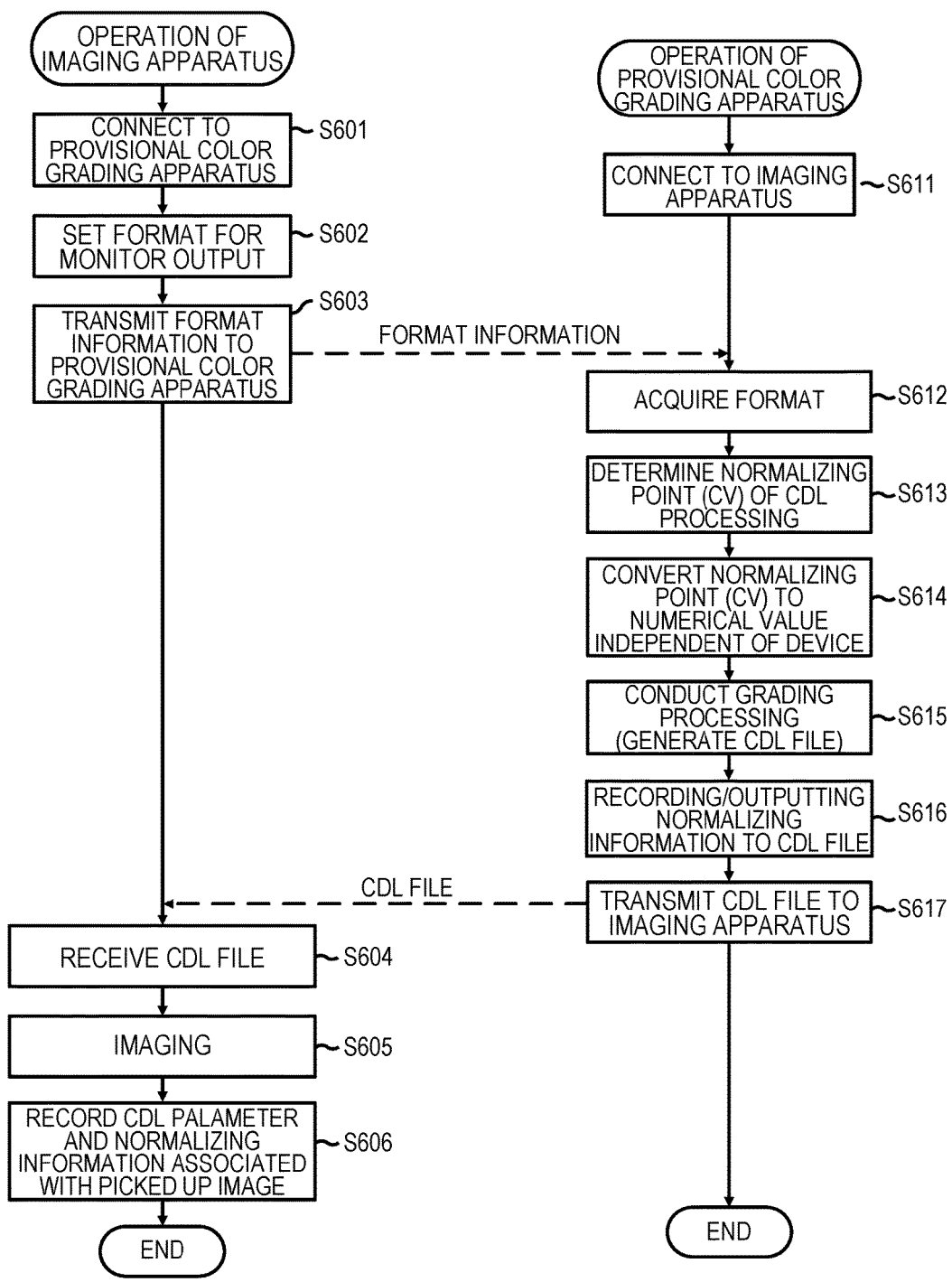

```
<ColorCorrectionCollection xmlns="urn:ASC:CDL:v1.2">
    <ColorCorrection id="cc012345">
    <ColorCorrection format="ACES-Proxy10">      .... (A)

<SOPNode>
                <Slope>   1  1  1 </Slope>
                <Offset>  0  0  0 </Offset>
                <Power>  1.2 1.2 1.2 </Power>    .... (B)

</SOPNode>
        <SATNode>
             <Saturation> 0 </Saturation>
        </SATNode>
         <NMLNode>
            <CVNomalize>      64,  940</CVNormalize>  .... (C)
            <ACESNomalize> 0.0012, 224</ACESNormalize> .... (D)
         </NMLNode>
    </ColorCorrection>
</ColorCorrectionCollection>
```

FIG. 8B

```
<ColorCorrectionCollection xmlns = "urn:ASC:CDL:v1.2">
     <ColorCorrection id ="cc012345">
     <ColorCorrection format = "ACES-Proxy10">
           <SOPNode>
                   <Slope>  1  1  1 </Slope>
                   <Offset>  0  0  0 </Offset>
                   <Power> 1.2 1.2 1.2 </Power>
           </SOPNode>
           <SATNode>
                   <Saturation> 0 </Saturation>
           </SATNode>

</ColorCorrection>
</ColorCorrectionCollection>
```

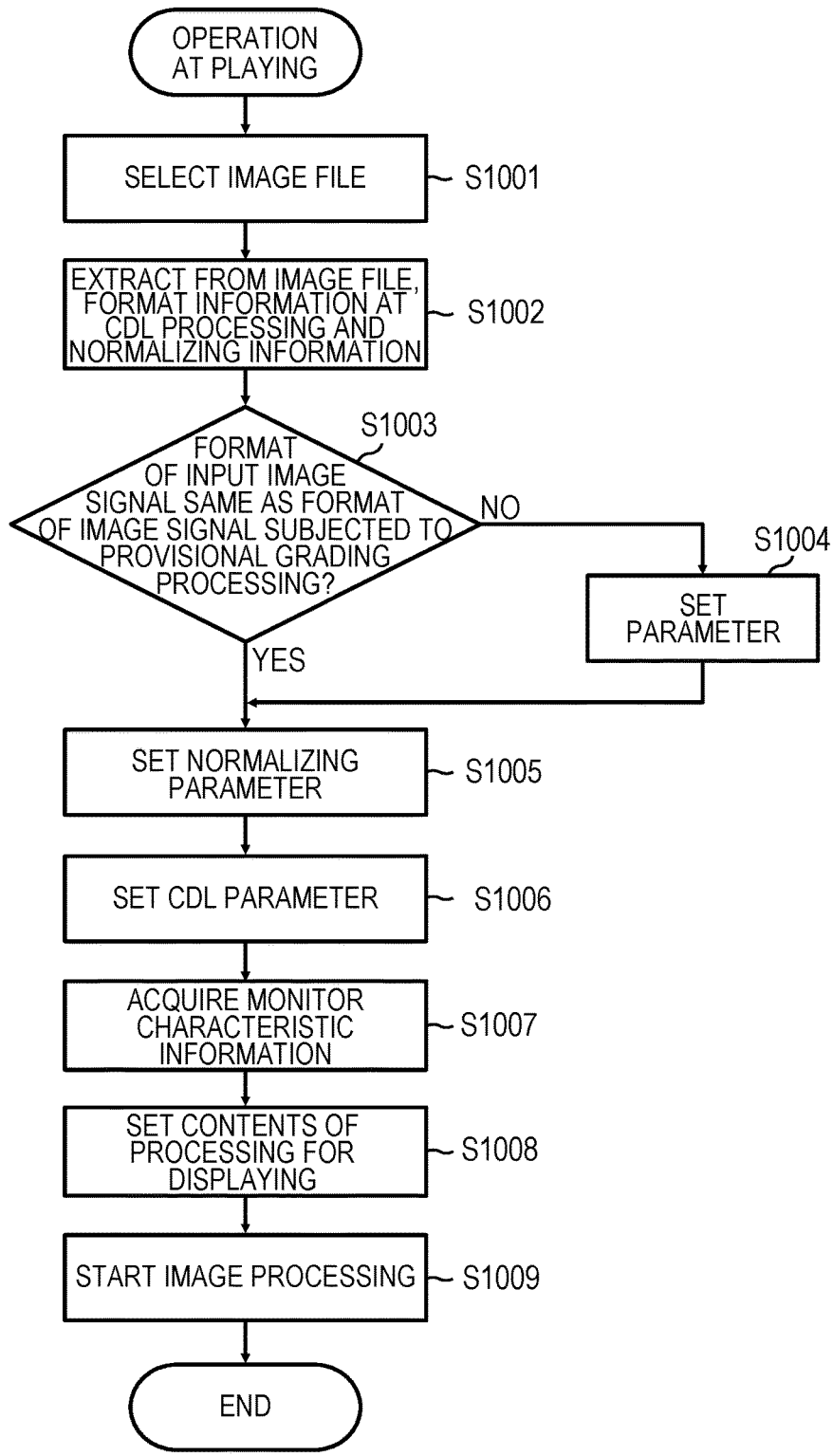

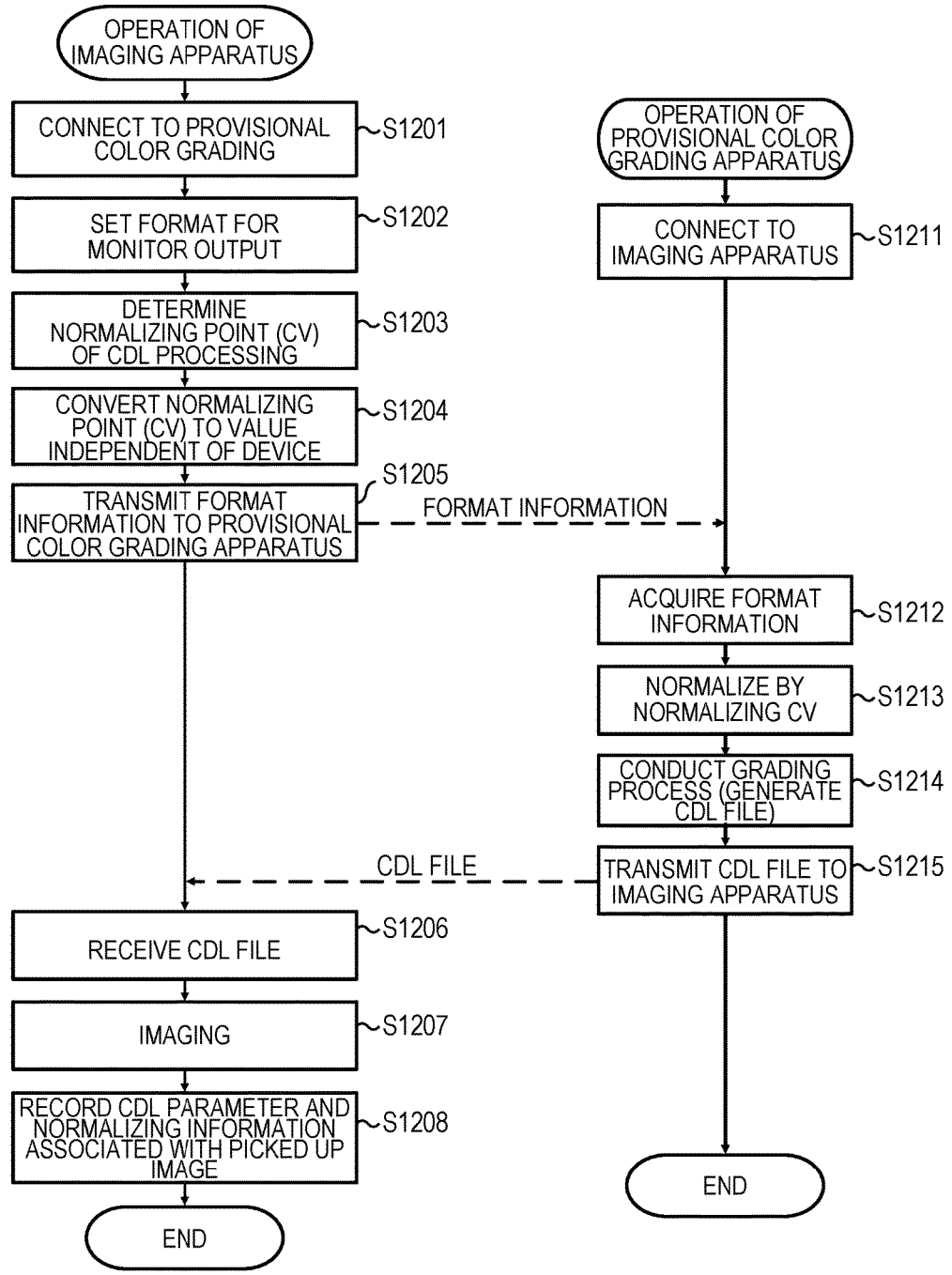

Log GAMMA 1

ACES Proxy

ACES-Log

```
<ColorCorrectionCollection xmlns="urn:ASC:CDL:v1.2">
    <ColorCorrection id="cc012345">
      <ColorCorrection format = "ACES-Proxy10">          · · · · (A)
      <Gamma         format = "ACES-Proxy">              · · · · (B)

<SOPNode>
            <Slope>   1   1   1 </Slope>
            <Offset>  0   0   0 </Offset>
            <Power> 1.2 1.2 1.2 </Power>                 · · · · (C)

</SOPNode>
        <SATNode>
            <Saturation> 0 </Saturation>
        </SATNode>

</ColorCorrection>
</ColorCorrectionCollection>
```

FIG. 19

|  |  | PROVISIONAL COLOR GRADING FORMAT | INPUT FORMAT TO SUBSTANTIAL COLOR GRADING APPARATUS | SUBSTANTIAL COLOR GRADING FORMAT |
|---|---|---|---|---|
| EXAMPLE 1 | COLOR SPACE / GAMMA | ACES / ACES-Proxy | sRGB / Log GAMMA 1 | ACES / ACES-Log |
| EXAMPLE 2 | COLOR SPACE / GAMMA | sRGB / Log GAMMA 1 | sRGB / Log GAMMA 1 | sRGB / Log GAMMA 1 |

IMAGE PROCESSING APPARATUS AND IMAGING APPARATUS

CROSS-REFERENCE TO RELATED APPLICATIONS

This application claims priority to International Application No. PCT/JP2014/083491 filed on Dec. 11, 2014, the entire disclosure of which is hereby incorporated by reference.

TECHNICAL FIELD

The present invention relates to an image processing apparatus and an imaging apparatus, and particularly, to an image processing apparatus and an imaging apparatus suitable for use in image processing of a picked up image.

BACKGROUND ART

Conventionally, there is an imaging apparatus, such as a digital camera, that photographs an object, such as a person, and records moving images. In a production site of digital cinema, cut editing and color grading processing for correcting photographed images are generally performed to obtain a desired appearance. A color grading apparatus is used in an editing studio to execute the color grading processing after photographing. Meanwhile, a workflow is also used in a photographing site, in which rough provisional color grading (onset grading) is performed at photographing, and substantial color grading that is fine adjustment is performed after photographing. The provisional color grading at photographing in the photographing site allows figuring out a final finished image at photographing, and the load of the substantial color grading performed after photographing can be reduced.

In the provisional color grading at photographing, the digital camera records an image and outputs the image to an external color grading apparatus through 3G-SDI and HD-SDI cables. The color grading apparatus performs color grading processing to the input image and records parameters of the color grading. An image processing apparatus that performs provisional color grading at photographing in a camera is disclosed (see Japanese Patent Application Laid-Open No. 2009-21827).

According to the conventional technique, parameters of provisional color grading are added to a photographed image at photographing. In substantial color grading processing after photographing, processing based on the parameters of the provisional color grading added to the photographed image at photographing is performed to re-produce the result of the provisional color grading at photographing. The user performs fine adjustment (substantial color grading) of the image after the provisional color grading. This can reduce the load of operation of the substantial color grading after photographing, as described above.

However, when the processing ranges are different in the provisional color grading apparatus and the substantial color grading apparatus, the provisional color grading processing performed in the provisional color grading apparatus may not be able to be re-produced in the substantial color grading processing.

An object of the present invention is to re-produce, in another image processing apparatus, contents of image processing performed in an image processing apparatus.

SUMMARY OF INVENTION

According to an aspect of the present invention, an image processing apparatus comprises: an acquiring unit configured to acquire an image signal; and an image processing unit configured to perform an image processing to a predetermined range of a signal level of the image signal, wherein an output unit configured to output information regarding the predetermined range associated with a parameter used in the image processing.

According to a further aspect of the present invention, an image processing apparatus comprises: an acquiring unit configured to acquire an image signal; an information acquiring unit configured to acquire (1) a parameter used in an image processing of an image signal in an external image processing apparatus, and to acquire (2) information regarding a range applied to the image processing, and an image processing unit configured to perform an image processing to re-produce the image processing in the external image processing apparatus, based on the parameter and the information regarding the range.

According to a still further aspect of the present invention, an imaging apparatus comprises: an imaging unit; an acquiring unit configured to acquire, from an external image processing unit, a parameter used in an image processing of an image signal acquired by the imaging unit in the external image processing unit, and to acquire information regarding a range to which the image processing is applied; and a recording unit configured to record the image signal acquired by the imaging unit, the parameter and the information regarding the range, associated with one another.

Further features of the present invention will become apparent from the following description of exemplary embodiments with reference to the attached drawings.

BRIEF DESCRIPTION OF DRAWINGS

FIG. 6 is a flow chart describing a first process example of the system.

FIGS. 8A and 8B are diagrams illustrating CDL files.

FIG. 10 is a flow chart describing operation of a substantial color grading apparatus.

FIG. 12 is a flow chart describing a second process example of the system.

FIG. 16 is a diagram illustrating a CDL file.

FIG. 19 shows a method of determining the gamma characteristics.

DESCRIPTION OF EMBODIMENTS

Hereinafter, embodiments of the present invention will be described in detail with reference to the drawings.

First Embodiment

A first embodiment will be described. In an example described in the present embodiment, image processing corresponding to color grading is performed during photographing, parameters of the color grading are recorded, and the parameters are used to perform image processing corresponding to color grading after photographing.

Figure 1:
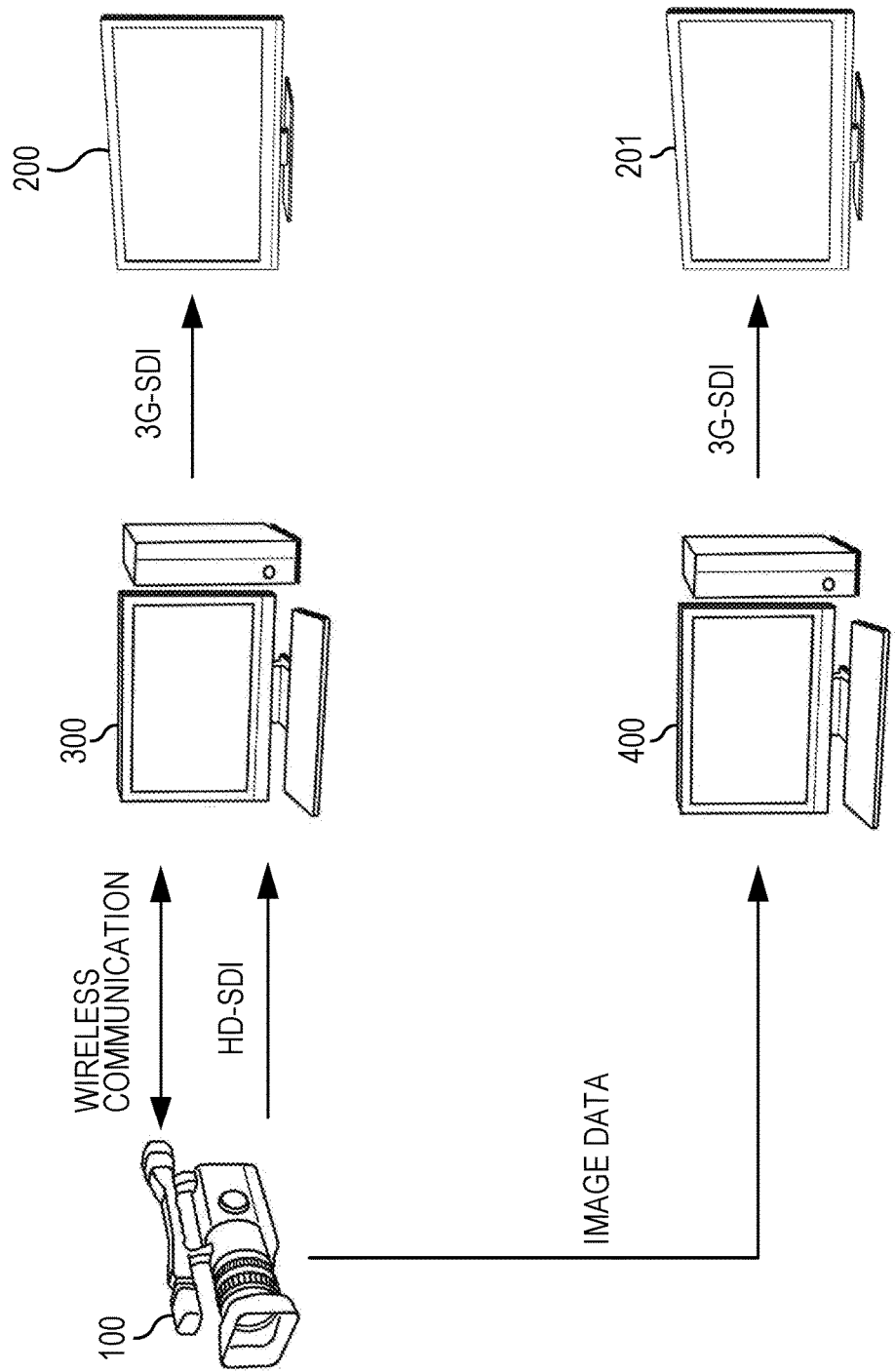
FIG. 1 is a diagram illustrating a configuration of a color grading system.

FIG. 1 is a diagram illustrating an example of a relationship between devices that perform color grading processing (configuration of color grading system).

In FIG. 1, an imaging apparatus 100 is a digital camera. A provisional color grading apparatus 300 performs provisional color grading, such as correction of color and luminance, to an image at imaging. A monitor 200 displays the image subjected to the provisional grading. A substantial color grading apparatus 400 performs substantial color grading processing to an image picked up by the imaging apparatus 100. A monitor 201 displays the image subjected to the substantial grading processing. The color grading processing changes the appearance (look) of the image.

An example of a summary of operation of the devices in the color grading system illustrated in FIG. 1 will be described.

The imaging apparatus 100 images an object, records the picked up image in a recording medium, and outputs an image being picked up to the provisional color grading apparatus 300 through an HD-SDI cable. The provisional color grading apparatus 300 performs provisional color grading processing to the image being picked up that is input from the imaging apparatus 100 and roughly adjusts the appearance (look) of the image. The provisional color grading apparatus 300 outputs the image subjected to the provisional color grading processing to the monitor 200 through a 3G-SDI cable.

After the end of imaging by the imaging apparatus 100, the substantial color grading apparatus 400 reads out image signals picked up by the imaging apparatus 100 from the recording medium. The substantial color grading apparatus 400 performs processing equivalent to the provisional color grading to image data read out from the recording medium based on parameters of the color grading output from the provisional color grading apparatus 300. The substantial color grading apparatus 400 further performs substantial color grading processing to the image after the processing equivalent to the provisional color grading to adjust the detailed look of the image. The substantial color grading apparatus 400 outputs the image signals after the substantial color grading processing to the monitor 201 through a 3G-SDI cable.

Next, an example of a detailed configuration of the devices in the color grading system illustrated in FIG. 1 will be described.

Figure 2:
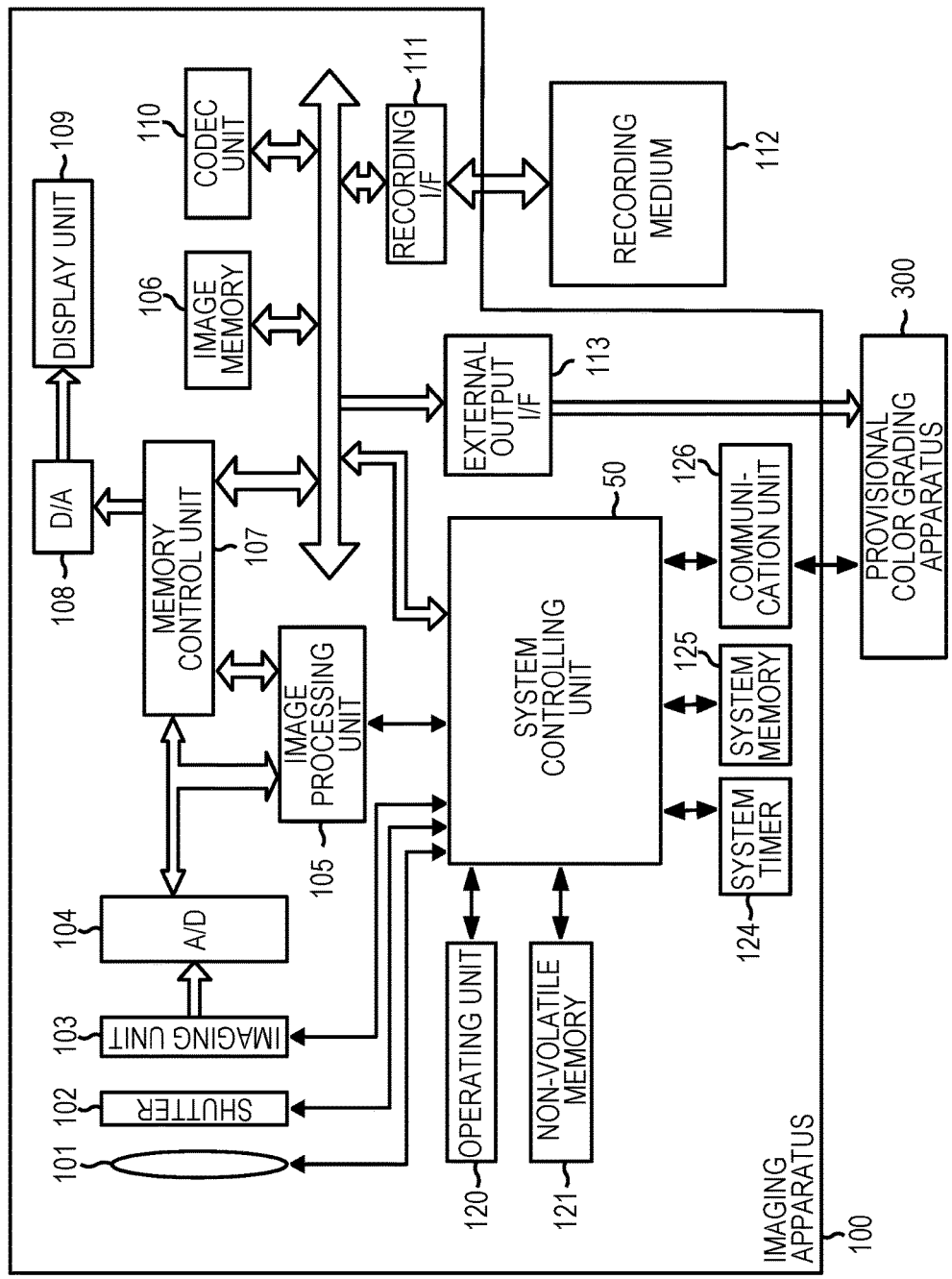
FIG. 2 is a diagram illustrating a configuration of an imaging apparatus.

FIG. 2 is a diagram illustrating an example of a configuration of the imaging apparatus 100.

In FIG. 2, a lens group 101 includes a zoom lens and a focus lens. A shutter 102 has a diaphragm function. An imaging unit 103 includes CCD and CMOS elements that convert an optical image into an electrical signal. An A/D converter 104 converts an analog signal output from the imaging unit 103 into a digital signal. An image processing unit 105 performs various image processing, such as white balance processing, γ processing, and color correction processing, to image signals output from the A/D converter 104. A memory control unit 107 controls storage operation of an image memory 106. A D/A converter 108 converts a digital signal input from the memory control unit 107 into an analog signal. A display unit 109 is a display device, such as an LCD, that displays an image. A codec unit 110 performs compression encoding and decoding of image data.

A recording interface (I/F) 111 transmits and receives data to and from a recording medium 112. The recording medium 112 is an external recording medium, such as a memory card and a hard disk. An external output interface (I/F) 113 controls output of image signals to an external apparatus such as the provisional color grading apparatus 300. A system controlling unit 50 controls the entire system of the imaging apparatus 100.

An operating unit 120 is used by the user to input various operation instructions to the imaging apparatus 100. A non-volatile memory 121 is a memory that can electrically delete and record data, and for example, an EEPROM is used as the non-volatile memory 121.

A system timer 124 measures time used for various controls and time of an embedded clock. A system memory 125 expands constants and variables necessary for the operation of the system controlling unit 50 as well as programs read out from the non-volatile memory 121. A communication unit 126 performs wireless communication with an external apparatus, such as the provisional color grading apparatus 300.

Next, an example of a flow of basic processing in the imaging apparatus 100 for imaging an object will be described.

The imaging unit 103 photoelectrically converts light entered through the lens group 101 and the shutter 102 and outputs analog image signals to the A/D converter 104. The A/D converter 104 converts the analog image signals output from the imaging unit 103 into digital image signals and outputs the digital signals to the image processing unit 105.

The image processing unit 105 performs color conversion processing, such as white balance, and γ processing to the image signals output from the A/D converter 104 or to the image signals read out from the memory control unit 107 (details of the processing will be described later). The image processing unit 105 uses the image signals output from the A/D converter 104 to perform predetermined arithmetic processing. The system controlling unit 50 controls exposure and controls measurement of distance based on the result of the arithmetic processing. In this way, AF (Auto Focus) processing and AE (Automatic Exposure) processing are performed based on a TTL (Through-The-Lens) system. The image processing unit 105 further uses the image signals output from the A/D converter 104 to estimate a light source and performs AWB (Auto White Balance) processing based on the estimated light source.

The image signals output from the image processing unit 105 are written as image data in the image memory 106 through the memory control unit 107. The image memory 106 stores, as image data, the image signals output from the A/D converter 104 and the image signals to be displayed on the display unit 109.

The D/A converter 108 converts the image data for displaying stored in the image memory 106 into analog signals and supplies the analog signals to the display unit 109. The display unit 109 performs displaying on a display device such as an LCD, according to the analog signals output from the D/A converter 108. The memory control unit 107 outputs the image data stored in the image memory 106 to the external provisional color grading apparatus 300 through the external output interface 113.

The codec unit 110 compresses and encodes the image data recorded in the image memory 106 based on a standard such as MPEG. The system controlling unit 50 stores one of the image data encoded by the codec unit 110 and uncompressed image data in the recording medium 112 through the recording interface 111.

The basic operation at imaging by the imaging apparatus 100 has been described.

Other than the basic operation, the system controlling unit 50 executes programs recorded in the non-volatile memory 121 to realize processing of the present embodiment described later. The programs here denote programs for executing the contents of various flow charts and sequence diagrams described later in the present embodiment. In this case, the constants and variables for the operation of the system controlling unit 50 as well as the programs read out from the non-volatile memory 121 are expanded in the system memory 125.

Figure 3:
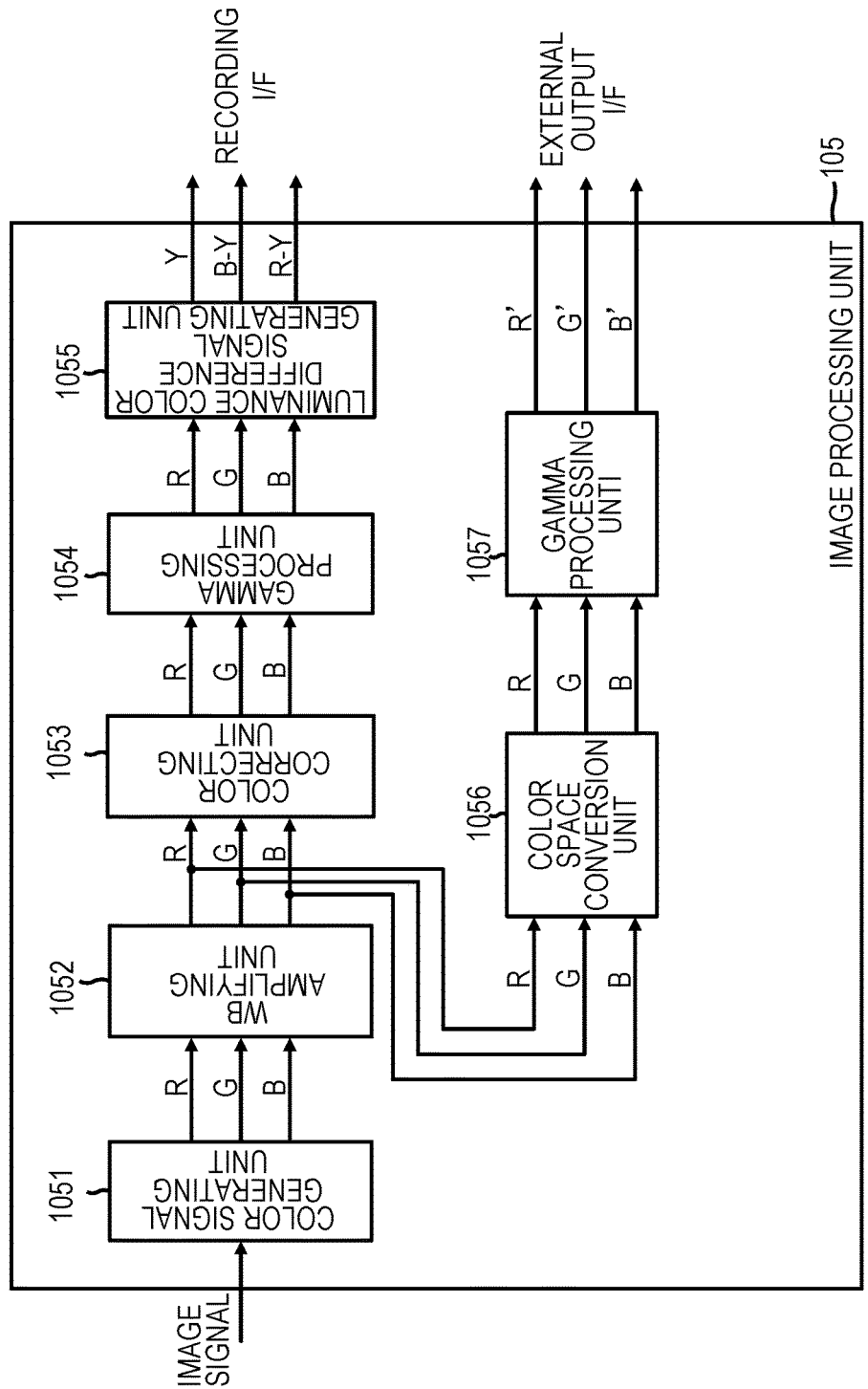
FIG. 3 is a diagram illustrating a configuration of an image processing unit.

Next, an example of details of the processing by the image processing unit 105 of the imaging apparatus 100 will be described. FIG. 3 is a diagram illustrating an example of a detailed configuration of the image processing unit 105.

In FIG. 3, the image processing unit 105 includes a color signal generating unit 1051, a WB (White Balance) amplifying unit 1052, a color correction processing unit 1053, a gamma processing unit 1054, a luminance color difference signal generating unit 1055, a color space conversion unit 1056, and a gamma processing unit 1057.

As described, the image signals are input from the A/D converter 104 to the image processing unit 105 illustrated in FIG. 2.

The image signals input to the image processing unit 105 are signals in a RAW format of Bayer RGB and are input to the color signal generating unit 1051.

The color signal generating unit 1051 performs synchronizing processing to the input image signals to generate RGB color signals R, G, and B. The color signal generating unit 1051 outputs the generated RGB color signals R, G, and B to the WB amplifying unit 1052.

The WB amplifying unit 1052 applies gains to the RGB color signals R, G, and B based on white balance gain values calculated by the system controlling unit 50 to adjust the white balance.

The color correction processing unit 1053 performs 3×3 matrix arithmetic processing and three-dimensional LUT (Look Up Table) processing to the RGB color signals R, G, and B with adjusted white balance to correct the tone.

The gamma processing unit 1054 performs gamma correction, such as application of gamma according to Rec. 709 standard and gamma in a log format, to the RGB color signals R, G, and B with corrected tone.

The luminance color difference signal generating unit 1055 generates a luminance signal Y and color difference signals R-Y and B-Y from the RGB color signals R, G, and B subjected to the gamma correction.

The luminance color difference signal generating unit 1055 outputs the generated luminance signal Y and color difference signals R-Y and B-Y to the external output interface 113 and the recording interface 111.

Meanwhile, the color space conversion unit 1056 converts the color space of the RGB color signals R, G, and B with adjusted white balance into a color space for external monitor output.

An example of converting the color space into one of an sRGB color space and an ACES color space for external monitor output will be described in the present embodiment. The ACES color space is a color space of an ACES (Academy Color Encoding System) standard proposed by the Academy of Motion Picture Arts and Sciences (AMPAS).

When the color space for external monitor output is the sRGB color space, the color space conversion unit 1056 performs processing of converting RGB values of the RGB color signals R, G, and B with adjusted white balance into RGB values of the sRGB color space. On the other hand, when the color space for external monitor output is the ACES color space, the color space conversion unit 1056 performs IDT (Input Device Transform) processing in the ACES standard to the RGB color signals R, G, and B with adjusted white balance. The RGB values of the ACES color space are generated in the IDT processing. The IDT processing is processing including correction processing of color reproducibility and conversion processing of color space.

The gamma processing unit 1057 performs gamma processing (gamma correction) to linear image signals in which the color space is converted by the color space conversion unit 1056. Specifically, when the color space for external monitor output is the sRGB color space, the gamma processing unit 1057 applies a log gamma (log gamma 1 in the present embodiment) unique to the imaging apparatus 100 to the linear image signals in which the color space is converted by the color space conversion unit 1056. The gamma processing unit 1057 outputs the image signals (sRGB signals) subjected to the gamma processing to the external output interface 113. The log gamma denotes a gamma curve in which logarithmic functions express the relationship between input and output.

On the other hand, when the color space for external monitor output is the ACES color space, the gamma processing unit 1057 performs gamma processing of applying gamma in an ACES-Proxy format to the linear image signals in which the color space is converted by the color space conversion unit 1056. The gamma processing unit 1057 outputs the image signals (RGB signals (ACES signals (ACES-Proxy RGB))) subjected to the gamma processing to the external output interface 113. The ACES-Proxy is a transmission standard of ACES signals currently being standardized.

Details of the image processing unit 105 have been described.

Returning to the description of FIG. 2, the recording interface 111 controls the signals exchanged with the recording medium 112 and outputs the input image signals as image data to the recording medium 112. The image data recorded in the recording medium 112 in the present embodiment includes the signals in the RAW format of Bayer RGB or the luminance signal Y and the color difference signals R-Y and B-Y.

The external output interface 113 changes the image signals (such as ACES signals) after the gamma processing output from the image processing unit 105 into a form that allows transmitting the signals as 3G-SDI signals and outputs the image signals after the gamma processing to the provisional color grading apparatus 300.

The configuration of the imaging apparatus 100 and the flow of the image signals at imaging have been described.

Next, an example of a configuration and operation of the provisional color grading apparatus 300 will be described.

Figure 4:
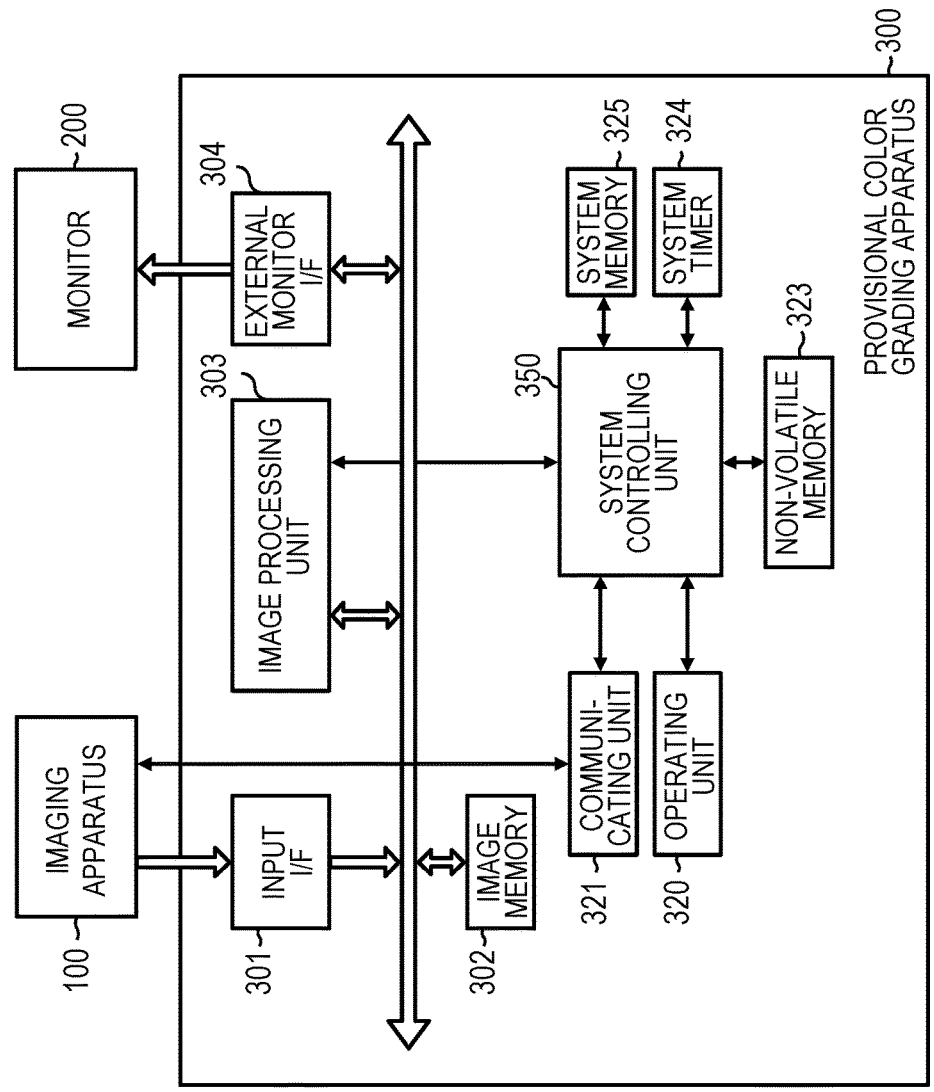
FIG. 4 is a diagram illustrating a schematic configuration of a color grading apparatus.

FIG. 4 is a diagram illustrating an example of a schematic configuration of the provisional color grading apparatus 300.

In FIG. 4, the input interface (I/F) 301 receives image signals output from the imaging apparatus 100. An image memory 302 stores the image signals. An image processing unit 303 performs various image processing, such as color conversion and gradation conversion, to the image signals. An external monitor interface (I/F) 304 controls output to the monitor 200 (external display apparatus) that is an external monitor.

A system controlling unit 350 controls the entire system of the provisional color grading apparatus 300. An operating unit 320 includes a mouse, a keyboard, and a touch panel and is used by the user to input various operation instructions to the provisional color grading apparatus 300. A communication unit 321 communicates with external devices, such as the imaging apparatus 100.

A non-volatile memory 323 is a memory that can electrically delete and record data. A system timer 324 measures time used for various controls and time of an embedded clock. A system memory 325 expands constants and variables necessary for the operation of the system controlling unit 350 as well as programs read out from the non-volatile memory 323.

Next, an example of basic operation of the provisional color grading apparatus 300 with the configuration will be described. In the example described here, the input interface 301 receives the image signals output through the external output interface 113 of the imaging apparatus 100, and provisional color grading processing is performed to the received image signals.

The system controlling unit 350 records the image signals from the imaging apparatus 100 input through the input interface 301 in the image memory 302.

The system controlling unit 350 determines parameters to be used in the imaging processing (provisional color grading processing) by the image processing unit 303 based on the input instruction of the user and the control described later and sets the parameters in the image processing unit 303.

The image processing unit 303 performs image processing including the provisional color grading processing to the image signals according to the set parameters and records the image signals subjected to the image processing in the image memory 302. The system controlling unit 350 reads out the image signals after the provisional color grading processing from the image memory 302 and outputs the image signals to the monitor 200 through the external monitor interface 304.

The flow of the processing in the provisional color grading apparatus 300 has been described, in which the provisional color grading processing is performed to the image signals output from the imaging apparatus 100, and the image signals subjected to the provisional color grading processing are output to the external monitor 200.

Figure 5A:
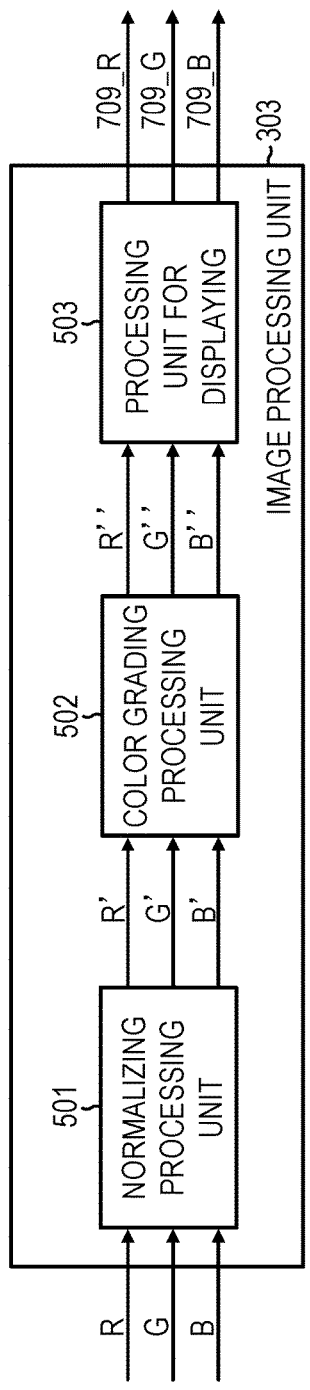
FIGS. 5A and 5B are diagrams illustrating a detailed configuration of the image processing unit.

Next, an example of details of the processing by the image processing unit 303 of the provisional color grading apparatus 300 will be described. FIG. 5A is a diagram illustrating an example of a detailed configuration of the image processing unit 303 of the provisional color grading apparatus 300.

The image signals (RGB signals) after the gamma processing are input to a normalizing processing unit 501 from the imaging apparatus 100. As described, the image signals (RGB signals) are RGB signals of ACES-Proxy standard or RGB signals after the application of the log gamma 1 in the sRGB color space.

The normalizing processing unit 501 determines normalizing points of the input image signals and normalizes the input image signals. In the present embodiment, the normalizing is performed by converting the RGB signals with values of 0 to 1023 into values between 0 (zero) and 1 based on CodeValues input in 10 bit integers. In this case, which CodeValues will be associated with 0 (zero) and 1 needs to be determined (that is, normalizing range needs to be determined). A method of determining the normalizing range will be described later.

RGB signals R', G', and B' normalized to values between 0 (zero) and 1 are input to a color grading processing unit 502.

The color grading processing unit 502 performs color grading processing according to the input instruction of the user. In the present embodiment, color grading processing that allows writing in CDL (Color Decision List) defined by ASC (The American Society Of Cinematographers) is performed as the color grading processing.

The color grading processing based on the CDL can be expressed by the following Formula (1), in which In denotes input to the color grading processing unit 502, and Out denotes output from the color grading processing unit 502.

$$Out=(slope \times In+offset)^{power} \tag{1}$$

Here, slope, offset, and power are parameters used for the color grading processing in the image processing unit 303. In the following description, the parameters used for the color grading processing will be called parameters of the color grading processing as necessary.

The system controlling unit 350 of the provisional color grading apparatus 300 receives contents of the operation performed by the user through the operating unit 320 for setting the parameters (slope, offset, and power) of the color grading processing. The system controlling unit 350 sets the parameters of the color grading processing in the color grading processing unit 502.

The color grading processing unit 502 outputs RGB image signals R", G", and B" after the color grading processing to a processing unit for displaying 503. The processing unit for displaying 503 performs gamma processing for displaying to the RGB image signals R", G", and B" to be processed. When the format of the input RGB image signals is the ACES-Proxy standard, the color grading processing unit 502 performs the following process. More specifically, the color grading processing unit 502 performs RRT (Reference Rendering Transform) processing and ODT (Output Device Transform) processing defined by the ACES standard. The RRT processing corrects the appearance (look) of the image for displaying, and gamma processing and color space conversion according to standard characteristics of the monitor 200 of the destination are performed in the ODT processing.

In the present embodiment, an example in which the monitor 200 connected to the provisional color grading apparatus 300 is a monitor of Rec.709 standard will be described. In this case, the processing unit for displaying 503 converts the color space of the input signals (RGB image signals R", G", and B") so that the signals fall within the color space of the Rec.709 standard. The processing unit for displaying 503 performs gamma processing based on the Rec.709 standard to the input signals (RGB image signals R", G", and B") with converted color space. The processing unit for displaying 503 outputs image signals (709_RGB signals) subjected to the gamma processing to the monitor 200 through the external monitor interface 304.

The configuration of the provisional color grading apparatus 300 and the flow of the image signals at imaging have been described.

The combination of the imaging apparatus 100, the provisional color grading apparatus 300, and the monitor 200 allows the user to perform provisional color grading for bringing the image displayed on the monitor 200 close to the desired appearance (look) at imaging.

Next, an example of processing will be described, in which the imaging apparatus 100 and the provisional color grading apparatus 300 communicate to exchange parameters (CDL parameters) of the color grading processing.

FIG. 6 is a flow chart describing an example of operation of the imaging apparatus 100 and the provisional color grading apparatus 300.

In step S601 of FIG. 6, the imaging apparatus 100 establishes connection to the provisional color grading apparatus 300 through the communication unit 126. Meanwhile, in step S611, the provisional color grading apparatus 300 establishes connection to the imaging apparatus 100 through the communication unit 321.

Next, in step S602, the imaging apparatus 100 sets a format for monitor output. As described, the following two types of formats, format A and format B, can be switched for the format for monitor output in the present embodiment.

Format A (color space: ACES, gamma: ACES-Proxy)
Format B (color space: sRGB, gamma: log gamma 1)

The imaging apparatus 100 can switch the formats for monitor output based on an input instruction of the user through the operating unit 120. The imaging apparatus 100 may communicate with the monitor 200 connected to the provisional color grading apparatus 300 to switch the formats for monitor output according to the setting of the monitor 200. The imaging apparatus 100 sets the parameters in the color space conversion unit 1056 and the gamma processing unit 1057 according to the color space and the gamma characteristics determined based on the formats.

In step S603, the imaging apparatus 100 transmits the format information (information of gamma and color space) set in step S602 to the provisional color grading apparatus 300 through the communication unit 126.

In the processing by the provisional color grading apparatus 300, the provisional color grading apparatus 300 acquires the format information transmitted from the imaging apparatus 100 in step S612. In the present embodiment, an example of a format information acquiring unit is realized in this way.

In step S613, the provisional color grading apparatus 300 determines CodeValues (normalizing points) that serve as references for normalizing the R, G, and B values of the RGB signals to values between 0 (zero) and 1.

The CodeValues that serve as references for normalizing are determined by the format information. When the format is the format A, the reference of 0 (zero) is set to 64 in CodeValue, and the reference of 1 is set to 940 in CodeValue. On the other hand, when the format is the format B, the reference of 0 is set to 128 in CodeValue, and the reference of 1 is set to 1019 in CodeValue. In the present embodiment, an example of a normalizing reference acquiring unit is realized in this way.

In step S614, the provisional color grading apparatus 300 converts the CodeValues that serve as references for normalizing determined in step S613 into numerical values independent of devices. In the present embodiment, ACES values are used for the numerical values independent of devices. In this case, the conversion into the ACES values is possible only when the format for monitor output is the format A (ACES).

Specifically, the values [64, 940] of CodeValues that serve as references for normalizing are converted into ACES values [0.0012, 224].

In step S615, the provisional color grading apparatus 300 normalizes the image signals (RGB signals) based on the CodeValues that serve as references for normalizing determined in step S613. The provisional color grading apparatus 300 uses Formula (1) to perform the color grading processing based on the CDL to the normalized image signals (RGB signals). In the present embodiment, an example of a normalizing unit and an image processing unit is realized in this way.

Figure 7A:
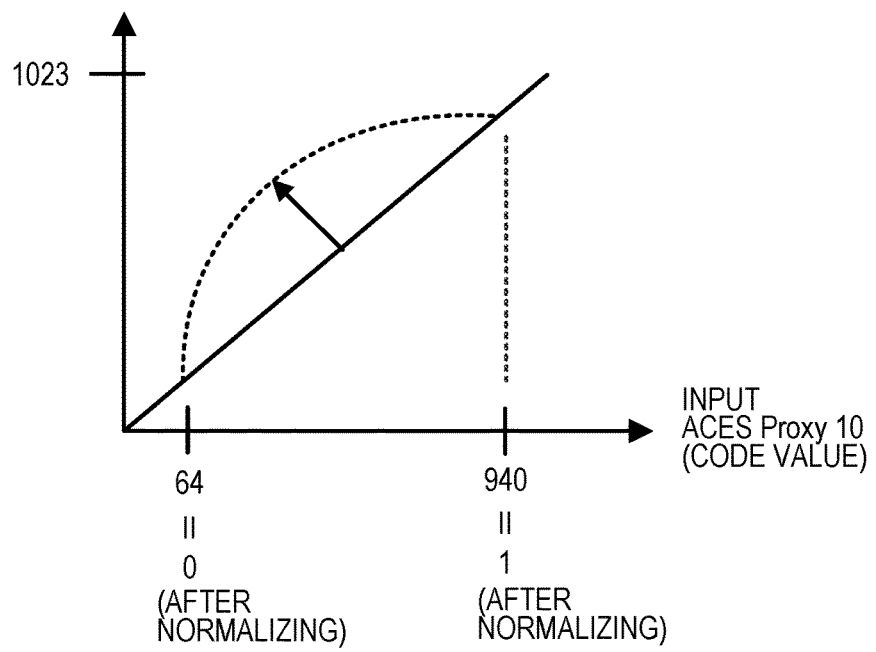
FIGS. 7A and 7B are diagrams describing a relationship between normalizing and color grading.
Figure 7B:
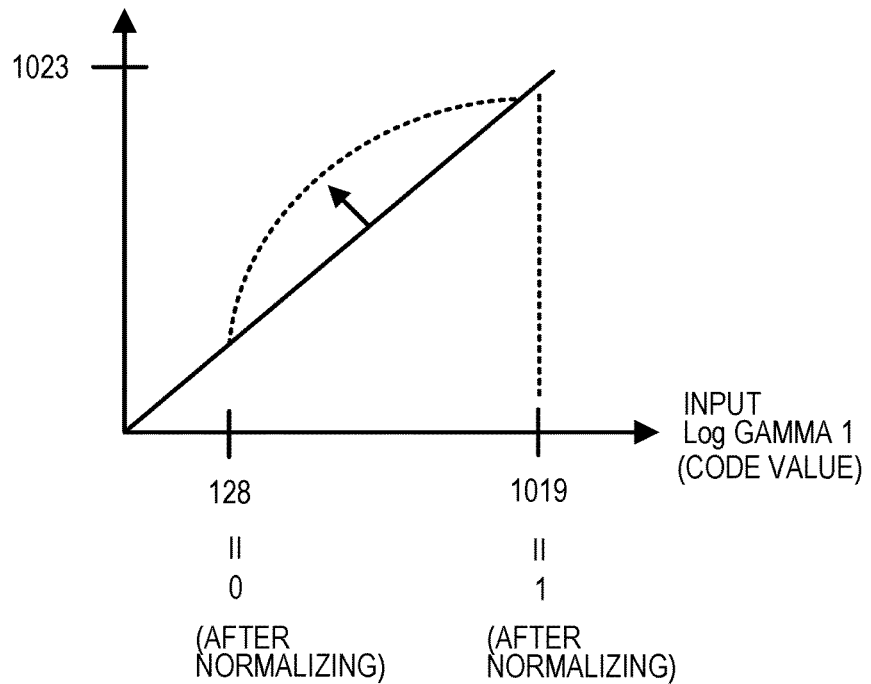

FIGS. 7A and 7B are diagrams describing an example of the relationship between the normalizing and the color grading based on the CDL. FIGS. 7A and 7B illustrate input and output characteristics when the normalized values of the RGB signals are converted by Formula (1) (formula of Power of CDL).

FIG. 7A illustrates input and output characteristics when the format for monitor output is the format A. FIG. 7A illustrates a result of multiplication of the signals normalized by [64, 940] by the Power function. FIG. 7B illustrates input and output characteristics when the format of the input image is the format B. FIG. 7B illustrates a result of multiplication of the signals normalized by [128, 1019] by the Power function. In FIGS. 7A and 7B, parts indicated by broken lines are values obtained by multiplying the normalized signals by Power (see Formula (1)).

For the other CDL parameters Gain and Slope, the RGB data after the normalizing is processed in the same way as for Power, although the details are not described.

The provisional color grading apparatus 300 generates a CDL file after performing the color grading processing based on the CDL. FIG. 8A is a diagram illustrating an example of a CDL file 800. In the present embodiment, tags are used to write the CDL. (A) illustrated in FIG. 8A indicates the format information. (B) indicates values of the parameters of Slope, Offset, and Power of each RGB signal.

Returning to the description of FIG. 6, the provisional color grading apparatus 300 records and outputs normalizing information to the created CDL file 800 in step S616. (C) and (D) illustrated in FIG. 8A indicate examples of recording of the normalizing information. Here, (C) indicates CodeValues (normalizing points) that serve as references for normalizing the values of the RGB signals. (D) indicates values obtained by converting the CodeValues that serve as references for normalizing into numerical values independent of devices (ACES values in the present embodiment). However, in a format such as the format B in which the CodeValues that serve as references for normalizing cannot be converted into numerical values independent of devices, only the CodeValues (normalizing points) that serve as references for normalizing the values of the RGB signals are recorded.

In the present embodiment, the CDL file is generated to associate and record the normalizing information, which is an example of a normalizing reference, and the parameters (CDL parameters) of the provisional grading processing in the same file.

Returning to the description of FIG. 6, the provisional color grading apparatus 300 transmits the generated CDL file 800 to the imaging apparatus 100 in step S617. In the present embodiment, an example of an output unit is realized in this way.

In step S604, the imaging apparatus 100 receives the CDL file 800. In the present embodiment, an example of a parameter acquiring unit and the normalizing reference acquiring unit is realized in this way.

In step S605, the imaging apparatus 100 performs imaging (recording).

Figure 9:
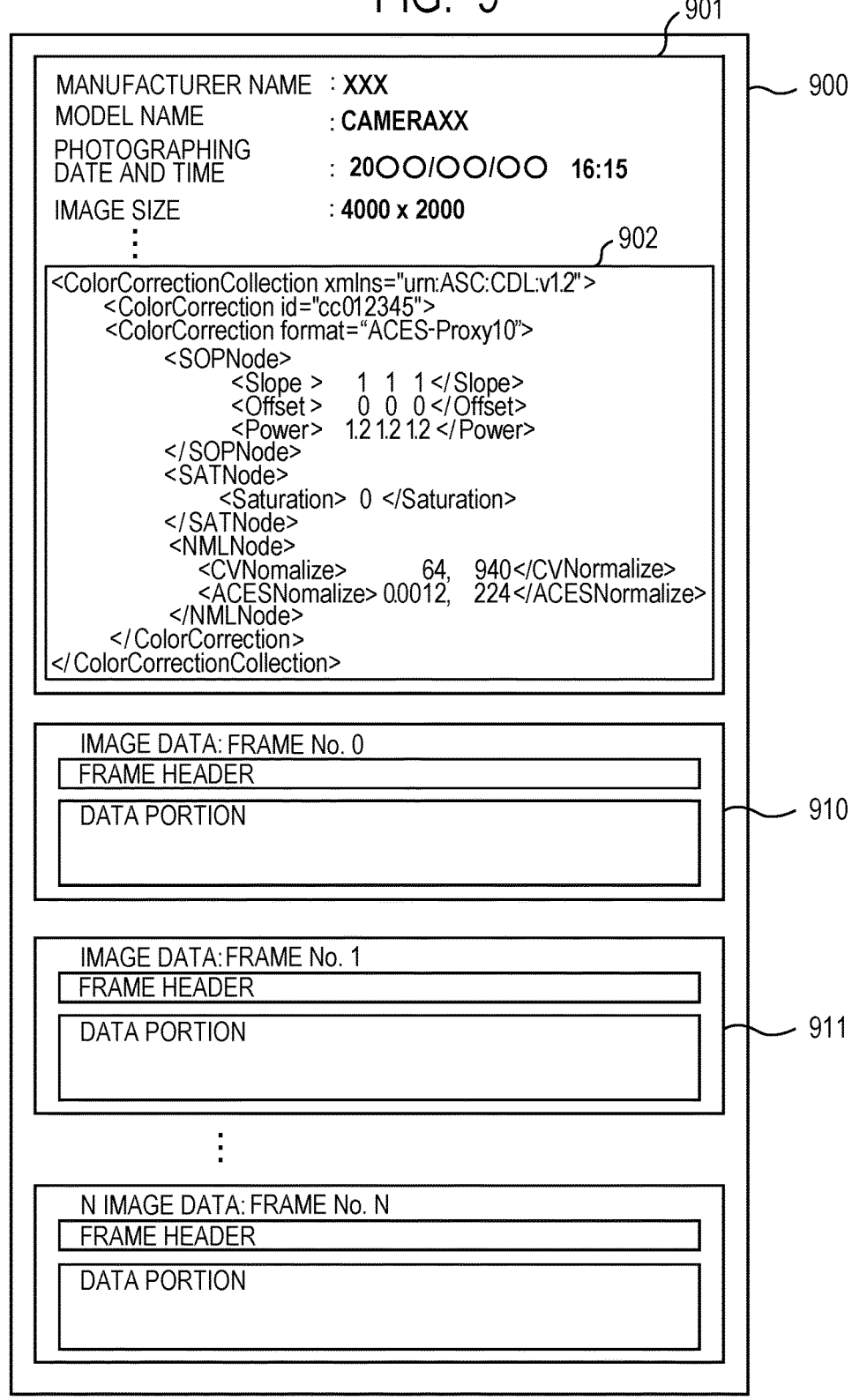
FIG. 9 is a diagram illustrating contents of an image file.

In step S606, the imaging apparatus 100 records the CDL file 800 acquired in step S604 in a file header of the picked up image file. FIG. 9 is a diagram conceptually illustrating an example of the image file.

FIG. 9 illustrates a file configuration of a clip recorded in the imaging apparatus 100. An image file 900 indicates the entire image clip file. The image file 900 includes a file header 901 and image frame data 910 and 911. Color grading parameters 902 are CDL parameters for color grading and are data written in the CDL file 800 received in step 604. The color grading parameters 902 are recorded as metadata in part of the file header 901. In the present embodiment, an example of a recording unit is realized in this way.

The color grading operation at imaging in the imaging apparatus 100 and the provisional color grading apparatus 300 has been described.

Next, an example of operation when the substantial color grading apparatus 400 performs substantial color grading processing to the image recorded in the imaging apparatus 100 will be described.

The schematic configuration of the substantial color grading apparatus 400 is the same as the schematic configuration of the provisional color grading apparatus 300 illustrated in FIG. 4, and the details will not be described here. In the substantial color grading apparatus 400, the configuration and the processing contents of the image processing unit 303 are different from those of the provisional color grading apparatus 300.

Figure 5B:
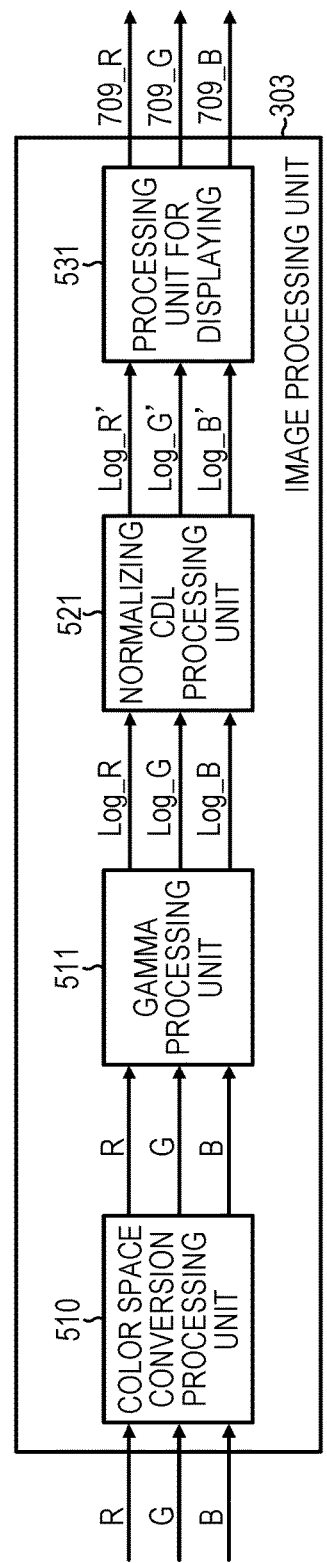

FIG. 5B is a diagram illustrating an example of a detailed configuration of the image processing unit 303 of the substantial color grading apparatus 400.

In FIG. 5B, a color space conversion processing unit 510 converts the color space of the input image signals (RGB signals). A gamma processing unit 511 performs gamma processing to the image signal with converted color space. A normalizing CDL processing unit 512 performs normalizing processing and color grading processing to the image signals subjected to the gamma processing. A processing unit for displaying 513 performs gamma correction and color space conversion for display device to the RGB signals subjected to the normalizing processing and the color grading processing.

The color space conversion processing unit 510 converts the color space of the input RGB signals according to conditions of an input format described later. The gamma processing unit 511 performs shape conversion of gamma to the image signals with converted color space, according to the conditions of the input format described later. The normalizing CDL processing unit 512 performs normalizing processing, CDL processing, and substantial color grading processing corresponding to the normalizing performed in the provisional color grading apparatus 300, to the image signals subjected to the gamma processing. The processing unit for displaying 513 performs gamma processing and color space conversion to the image signals subjected to the normalizing processing, the CDL processing, and the substantial color grading processing, according to the output device such as the monitor 201.

Here, an example of processing in the image processing unit 303 will be described, in which the color space of the image signals read out in the substantial color grading apparatus 400 is in the format B (color space: sRGB, gamma: log gamma 1).

When the provisional color grading is performed based on ACES-Proxy in the provisional color grading apparatus 300, the processing is performed by converting the values of the image signals to ACES values in the image processing unit 303 of the substantial color grading apparatus 400.

The color space conversion processing unit 510 converts the color space of the input image signals from sRGB to ACES. Here, the color space conversion processing unit 510 de-gammas the log gamma 1 to apply matrix processing to convert the color space of the input image signals from sRGB to ACES and outputs linear ACES signals R, G, and B to the gamma processing unit 511.

The gamma processing unit 511 converts the ACES signals R, G, and B to a log gamma to perform color grading in the substantial color grading apparatus 400. Here, the gamma processing unit 511 applies a log gamma of ACES-Log standard to the ACES signals R, G, and B. The ACES-Log standard is a log gamma for ACES signals currently being standardized.

The normalizing CDL processing unit 512 uses the same values as the normalizing values of the provisional color grading apparatus 300 to normalize ACES signals log_R, log_G, and log_B after the application of the log gamma of the ACES-Log standard (details will be described later in this point). Subsequently, the normalizing CDL processing unit 512 performs the CDL processing executed in the provisional color grading apparatus 300. The normalizing CDL processing unit 512 further performs the substantial color grading processing other than the CDL processing. The processing unit for displaying 513 performs processing of linearly correcting ACES-Log, RRT processing of ACES standard, and ODT processing (for example, ODT for sRGB) to ACES signals log_R', log_G', and log_B' subjected to the normalizing and the substantial color grading processing.

On the other hand, when the color grading processing is performed in the format B in the provisional color grading apparatus 300, processing is not particularly performed in the color space conversion processing unit 510, the gamma processing unit 511, and the processing unit for displaying 513. The normalizing CDL processing unit 512 performs the normalizing, the CDL processing executed in the provisional color grading processing, and the substantial color grading processing other than the CDL processing to the input image signals.

Next, an example of operation by the system controlling unit 350 of the substantial color grading apparatus 400 when the image file is read out to perform the substantial color grading processing will be described with reference to a flow chart of FIG. 10.

In step S1001, the system controlling unit 350 receives operation of the user through the operating unit 320 and selects the image file 900 to be subjected to color grading.

In step S1002, the system controlling unit 350 extracts the CDL, the format information at CDL processing, and the normalizing information (color grading parameters 902) from the file header 901 of the image file 900. In the present embodiment, an example of a normalizing reference acquiring unit is realized in this way.

In step S1003, the system controlling unit 350 determines whether the format of the image signals input at the provisional color grading processing and the format of the currently open image file are the same based on the information written in the CDL.

As a result of the determination, the process proceeds to step S1005 if the formats are the same, and the process proceeds to step S1004 if the formats are not the same.

In step S1004, the system controlling unit 350 determines parameters for making the color space of the input image signals the same as the color space of the image signals subjected to the provisional color grading processing. The system controlling unit 350 sets the determined parameters in the image processing unit 303 (color space conversion processing unit 510, gamma processing unit 511, and processing unit for displaying 513).

Figure 11A:
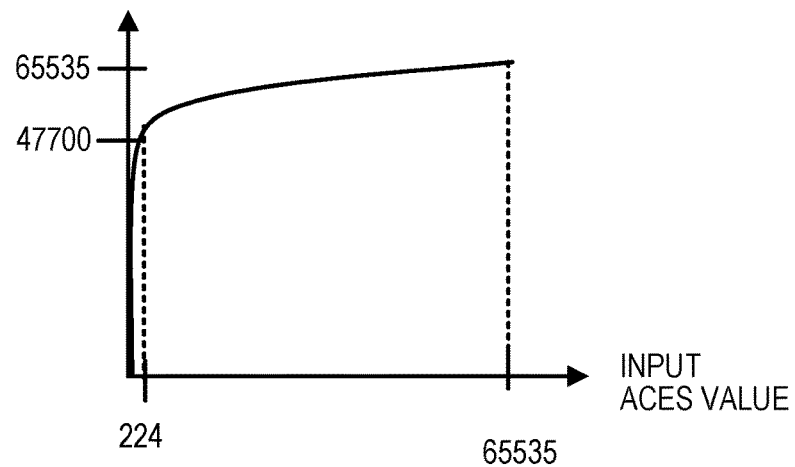
FIGS. 11A and 11B are diagrams describing substantial color grading processing.

For example, it is assumed that the image signals read out in the substantial color grading apparatus 400 are in the format B (color space: sRGB, gamma: log gamma 1). On the other hand, it is assumed that the image signals obtained in the provisional color grading apparatus 300 are in the format A (color space: ACES, gamma: ACES-Proxy). In this case, the system controlling unit 350 sets the parameters for converting the color space of the input image signals into ACES in the color space conversion processing unit 510. The system controlling unit 350 sets a gamma of ACES-Log standard in the gamma processing unit 511. FIG. 11A illustrates characteristics of the gamma of ACES-Log standard.

In step S1005, the system controlling unit 350 sets normalizing parameters in the normalizing CDL processing unit 512. The normalizing parameters are values used for the normalizing at the provisional color grading processing included in the normalizing information (color grading parameters 902) acquired in step S1002.

Specifically, the system controlling unit 350 sets normalizing parameters based on the ACES values independent of devices.

In the ACES-Log standard, values up to 65535 can be expressed by ACES values.

Figure 11B:
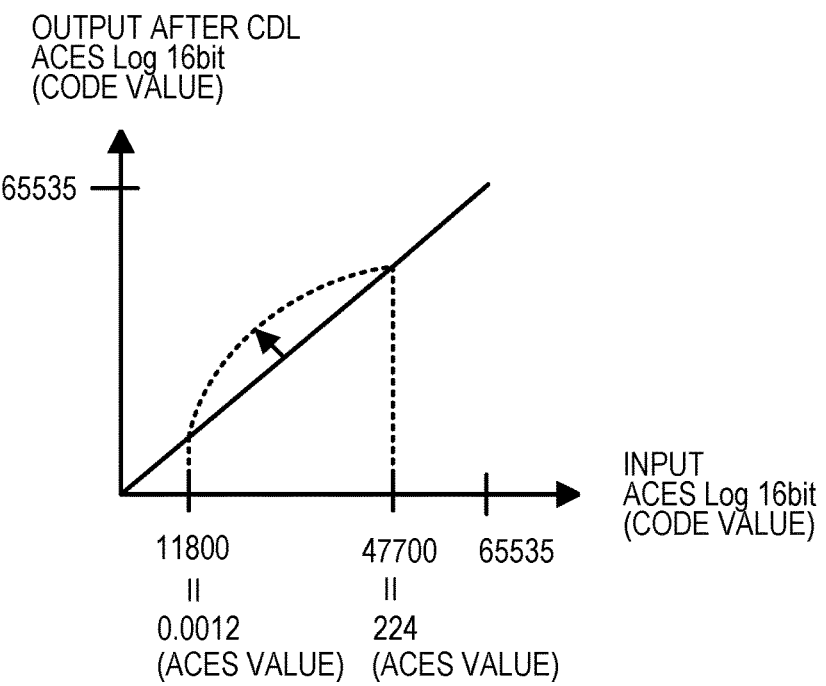

Meanwhile, when the normalizing in the provisional color grading apparatus 300 is performed by ACES value 224, the normalizing is performed by CodeValue indicating ACES value 224 in the ACES-Log standard. FIG. 11B illustrates the normalizing.

FIG. 11B is a diagram illustrating normalizing of image signals subjected to gamma conversion into the ACES-Log format in the gamma processing unit 511 of the substantial color grading apparatus 400. In FIG. 11B, normalizing is performed to handle an ACES value of 0.0012 as 0 and handle an ACES value of 224 as 1 in the input image signals. In this way, the CDL processing in the provisional color grading processing can be re-produced even if the ranges that can be handled by the provisional color grading apparatus 300 and the substantial color grading apparatus 400 are different.

Returning to the description of FIG. 10, in step S1006, the system controlling unit 350 extracts the CDL parameters that are contents of the color grading processing in the provisional color grading apparatus 300 (see FIG. 8A) and sets the CDL parameters in the normalizing CDL processing unit 512. As described, Power is calculated after the normalizing by handling the ACES value 224 as 1. FIG. 11B illustrates this. In the present embodiment, an example of the parameter acquiring unit is realized by the processing.

In step S1007, the system controlling unit 350 acquires the characteristic information of the monitor 201 connected to the substantial color grading apparatus 400. The system controlling unit 350 may communicate with the monitor 201 to acquire the characteristic information of the monitor 201 or may receive operation of the user through the operating unit 320 to acquire the characteristic information of the monitor 201.

In step S1008, the system controlling unit 350 determines the contents of processing by the processing unit for displaying 513 according to the characteristic information of the monitor 201 acquired in step S1007. For example, when the monitor 201 is a monitor for Rec.709 standard, the processing unit for displaying 513 performs ODT processing suitable for Rec.709 and outputs the result.

In step S1009, the system controlling unit 350 instructs the image processing unit 303 of FIG. 5B to start the processing for the read image file. In the present embodiment, the image processing unit 303 performs the processing based on the instruction to realize an example of the normalizing unit and the image processing unit.

As described, in the present embodiment, the provisional color grading apparatus 300 determines the normalizing points (CodeValues that serve as references for normalizing) of the input image signals according to the format information to normalize the input image signals. The provisional color grading apparatus 300 records the values (normalizing information) obtained by converting the normalizing points into numerical values independent of devices, in association with the parameters of color grading. In this way, equivalent processing can be performed even if the dynamic ranges handled in the provisional color grading processing and the substantial color grading processing are different. Therefore, the result of the provisional color grading processing at imaging can be more correctly re-produced in the substantial color grading processing after imaging.

In the example described in the present embodiment, the color space independent of devices is an ACES color space. However, the color space independent of devices is not limited to the ACES color space. For example, a unique color space can be provided and used.

In the example of the format described in the present embodiment, the normalizing information is recorded in the CDL file for recording the parameters of color grading. However, any method can be adopted as long as the parameters of color grading and the normalizing information are recorded in association with one another. For example, a method of recording the parameters of color grading and the normalizing parameters in separate files and writing a link to the file of the normalizing information in the file of the parameters of color grading can be adopted.

In the example described in the present embodiment, the file of the parameters of the provisional color grading processing is transferred toward the imaging apparatus 100 and recorded in the file header 901 of the picked up image. However, the parameters of the provisional color grading processing may not be recorded in the picked up image. For example, a method of managing the file of the parameters of the provisional color grading processing in association with the time code of the picked up image or any other configuration may be adopted as long as parameters of the provisional color grading processing and the picked up image are associated with one another.

Although the imaging apparatus 100 transfers, as the format information, the maximum value information of camera output (such as 16 in ACES value) to the provisional color grading apparatus 300 in the present embodiment, the imaging apparatus 100 may not transfer the information.

For example, the following is possible. The provisional color grading apparatus 300 registers in advance the model name of the imaging apparatus 100 and the format information according to the gamma characteristics in the nonvolatile memory 323. The provisional color grading apparatus 300 acquires the format information from the nonvolatile memory 323 according to the model name and the gamma characteristics of the imaging apparatus 100 connected to the provisional color grading apparatus 300.

In the example described in the present embodiment, the provisional grading processing and the substantial grading processing are performed. However, when the same image processing is performed as processing of correcting image signals in an apparatus with a different dynamic range of image signals that can be processed, the present embodiment is not limited to the case in which the provisional grading processing and the substantial grading processing are performed. For example, the method of the present embodiment can be applied when gamma conversion is performed or when the color gamut is converted.

In the example described in the present embodiment, the format for monitor output includes both of the color space and the gamma characteristics. However, the format may include only one of these. Basically, the format needs to include the gamma characteristics. However, there is a case in which the gamma characteristics are determined when the format of the color space is determined.

Second Embodiment

Next, a second embodiment will be described. In the first embodiment, the provisional color grading apparatus 300 determines the normalizing points of the image signals (CodeValues that serve as references for normalizing the values of the RGB signals) according to the format of the input image signals. In contrast, a case in which the imaging apparatus 100 determines the normalizing points of the image signals will be described in the present embodiment. In this way, part of the method of determining the normalizing points of the image signals in the present embodiment is mainly different from the first embodiment. More specifically, part of the processing by the system controlling units 50 and 350 of the imaging apparatus 100 and the provisional color grading apparatus 300 in the present embodiment is different from the first embodiment. Therefore, the same parts as in the first embodiment are designated with the same reference numerals provided in FIGS. 1 to 11B in the description of the present embodiment, and the details will not be described.

As in the first embodiment, the color grading system illustrated in FIG. 1 (system including the imaging apparatus 100, the provisional color grading apparatus 300, the substantial color grading apparatus 400, and the monitors 200 and 201) will be described in the present embodiment. The configuration of the system is the same as in the first embodiment.

FIG. 12 is a flow chart describing an example of operation of the imaging apparatus 100 and the provisional color grading apparatus 300.

In step S1201 of FIG. 12, the imaging apparatus 100 establishes connection to the provisional color grading apparatus 300 through the communication unit 126. Meanwhile, in step S1211, the provisional color grading apparatus 300 establishes connection to the imaging apparatus 100 through the communication unit 321.

Next, in step S1202, the imaging apparatus 100 sets a format for monitor output. In the present embodiment, the following two types of formats, format A and format B, can be switched for the format for monitor output, as in the first embodiment. In the present embodiment, an example of the format information acquiring unit is realized in this way.

Format A (color space: ACES, gamma: ACES-Proxy)
Format B (color space: sRGB, gamma: log gamma 1)

The imaging apparatus 100 sets parameters in the color space conversion unit 1056 and the gamma processing unit 1057 according to the color space and the gamma determined based on the formats.

In step S1203, the imaging apparatus 100 determines CodeValues (normalizing points) that serve as references for normalizing the R, G, and B values of the RGB signals in the CDL-based color grading processing performed in the provisional color grading apparatus 300. The normalizing points are determined by the format for monitor output and the dynamic range of photographing in the imaging apparatus 100.

For example, it is assumed that the imaging apparatus 100 can express a range up to 10 in ACES value. In this case, CodeValue (for example, 700) indicating 10 in ACES value in ACES-Proxy is the maximum value of the normalizing.

In the color space of the format A, [64, 700] in CodeValues are normalized to [0, 1]. Since the conversion to ACES values is not possible in the format B, the normalizing is performed by the maximum and minimum values [128, 1029] of CodeValues of the gamma characteristics.

In step S1204, the imaging apparatus 100 converts the normalizing points determined in step S1203 into numerical values independent of devices only in the format A. As in the first embodiment, ACES values are used as the numerical values independent of devices in the present embodiment. For example, the normalizing points are converted to values [0.0012, 10] in ACES values. When the format is the format B, the imaging apparatus 100 does not convert the normalizing points into ACES values. In the present embodiment, an example of the normalizing reference acquiring unit is realized in this way.

In step S1205, the imaging apparatus 100 transmits the format information set in steps S1202 and S1204 to the provisional color grading apparatus 300 through the communication unit 126. The format information includes the gamma and color space information and the normalizing points converted into the numerical values independent of devices.

In the processing by the provisional color grading apparatus 300, the provisional color grading apparatus 300 acquires the format information transmitted from the imaging apparatus 100 in step S1212. In the present embodiment, an example of the format information acquiring unit is realized in this way.

In step S1213, the provisional color grading apparatus 300 normalizes the image signals (RGB signals) based on the normalizing points converted into the numerical values independent of devices included in the format information. In the present embodiment, an example of the normalizing reference acquiring unit and the normalizing unit is realized in this way.

In step S1214, the imaging apparatus 100 uses Formula (1) to perform the color grading processing based on the CDL to the normalized image signals (RGB signals) to generate a CDL file. FIG. 8B illustrates an example of the CDL file generated here.

In step S1215, the provisional color grading apparatus 300 transmits the CDL file to the imaging apparatus 100. In the present embodiment, an example of the output unit is realized in this way.

Returning to the processing by the imaging apparatus 100, the imaging apparatus 100 receives the CDL file in step S1206.

In step S1207, the imaging apparatus 100 picks up (records) an image.

In step S1208, the imaging apparatus 100 records the information of the CDL file, the normalizing points, and the normalizing points (ACES values) converted into the numerical values independent of devices in the file header of the image file. The data recorded here is the same as in FIG. 9 described in the first embodiment. In the present embodiment, an example of the recording unit is realized in this way.

As described, in the present embodiment, the imaging apparatus 100 determines the normalizing points (ACES values in the present embodiment) converted into the numerical values independent of devices before the color grading in the CDL format and transfers the normalizing points to the provisional color grading apparatus 300. As a result, the provisional color grading apparatus 300 can change the normalizing points according to the characteristics of the range of the imaging apparatus 100 to normalize the values of the image signals.

Third Embodiment

In the present embodiment, the provisional color grading apparatus 300 outputs and records the gamma characteristics adopted in the provisional color grading processing in association with the parameters (CDL parameters) of the color grading processing.

Figure 14:
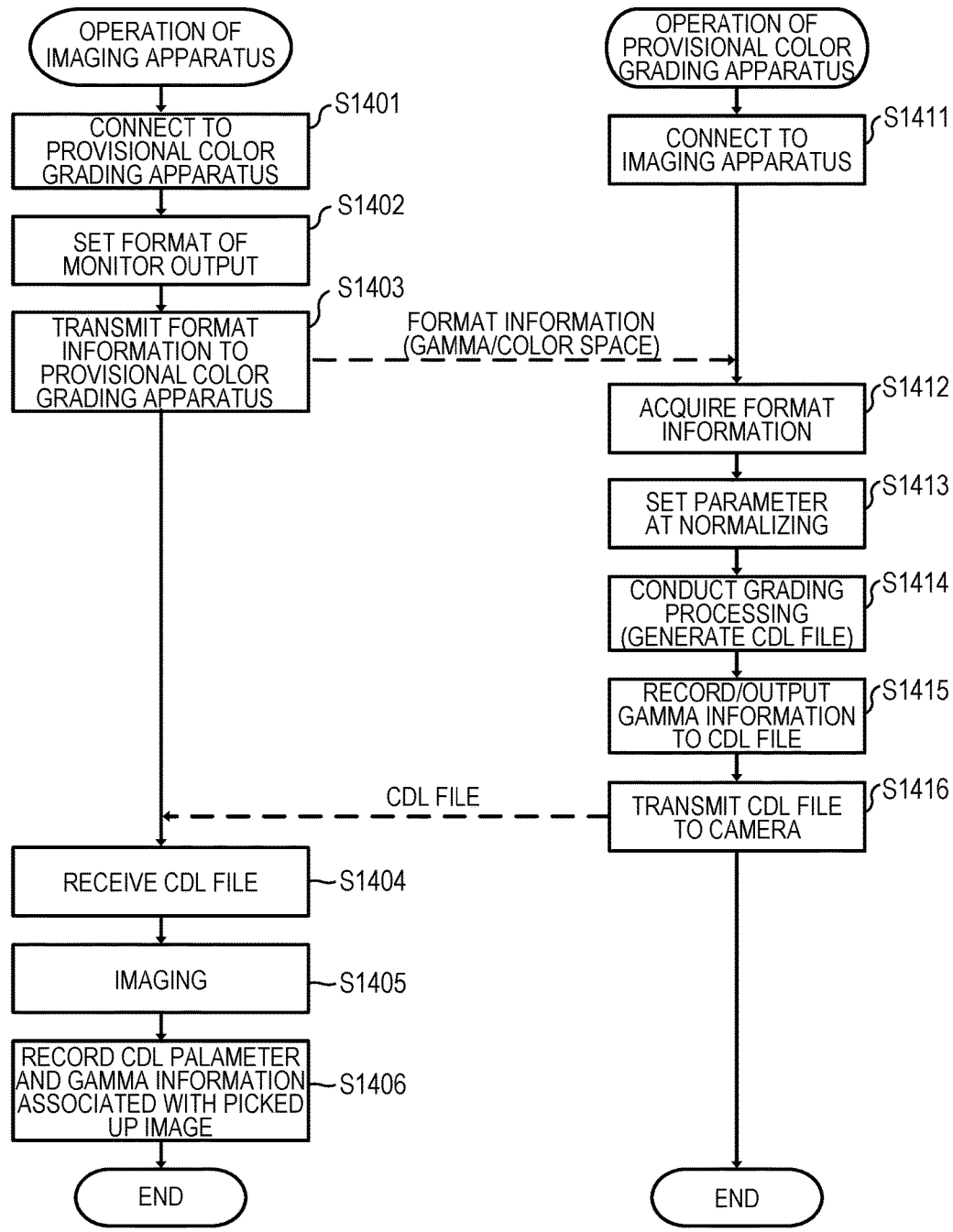
FIG. 14 is a flow chart of operation of an imaging apparatus and a provisional color grading apparatus.

FIG. 14 is a flow chart describing an example of operation of the imaging apparatus 100 and the provisional color grading apparatus 300.

In step S1401 of FIG. 14, the imaging apparatus 100 establishes connection to the provisional color grading apparatus 300 through the communication unit 126. Meanwhile, in step S1411, the provisional color grading apparatus 300 establishes connection to the imaging apparatus 100 through the communication unit 321.

Next, in step S1402, the imaging apparatus 100 sets a format for monitor output. As described, the following two types of formats, format A and format B, can be switched for the format for monitor output in the present embodiment.

Format A (color space: ACES, gamma: ACES-Proxy)
Format B (color space: sRGB, gamma: log gamma 1)

The imaging apparatus 100 can switch the formats for monitor output based on an input instruction of the user through the operating unit 120. The imaging apparatus 100 may communicate with the monitor 200 connected to the provisional color grading apparatus 300 to switch the formats for monitor output according to the setting of the monitor 200. The imaging apparatus 100 sets parameters in the color space conversion unit 1056 and the gamma processing unit 1057 according to the color space and the gamma characteristics determined based on the formats.

In step S1403, the imaging apparatus 100 transmits the format information (information of gamma and color space) set in step S1402 to the provisional color grading apparatus 300 through the communication unit 126.

In the processing by the provisional color grading apparatus 300, the provisional color grading apparatus 300 acquires the format information transmitted from the imaging apparatus 100 in step S1412.

In step S1413, the provisional color grading apparatus 300 sets, in the normalizing processing unit 501, parameters for normalizing the RGB signals with values of 0 to 1023 to values of 0 (zero) to 1 in the color grading processing based on the CDL. As described, in the case of 10 bits, the normalizing is performed by handling CodeValue=0 as 0 and handling CodeValue=1023 as 1.

In step S1414, the provisional color grading apparatus 300 normalizes the image signals (RGB signals) and sets, in the color grading processing unit 502, the parameters of the color grading processing based on the CDL, for the normalized images. In this way, Formula (1) is used to perform the color grading processing based on the CDL to the normalized image signals (RGB signals).

The provisional color grading apparatus 300 generates a CDL file after setting the parameters of the color grading processing based on the CDL. FIG. 16 is a diagram illustrating an example of a CDL file 1600. In the present embodiment, tags are used to write the CDL. (A) illustrated in FIG. 16 indicates the format information. (C) indicates values of the parameters of Slope, Offset, and Power of each RGB signal.

In step S1415, the provisional color grading apparatus 300 records and outputs the information of the gamma characteristics adopted in the provisional color grading processing to the CDL file 1600 created in step S1414. (B) illustrated in FIG. 16 indicates the information of the gamma characteristics adopted in the provisional color grading processing. The example of (B) illustrated in FIG. 16 indicates the CDL processed for the gamma characteristics in the ACES-Proxy format.

In step S1416, the provisional color grading apparatus 300 transmits the generated CDL file 1600 to the imaging apparatus 100.

In step S1404, the imaging apparatus 100 receives the CDL file 1600. In the present embodiment, an example of the parameter acquiring unit and a gamma characteristic acquiring unit of the imaging apparatus is realized by the process.

In step S1405, the imaging apparatus 100 picks up (records) an image.

Figure 17:
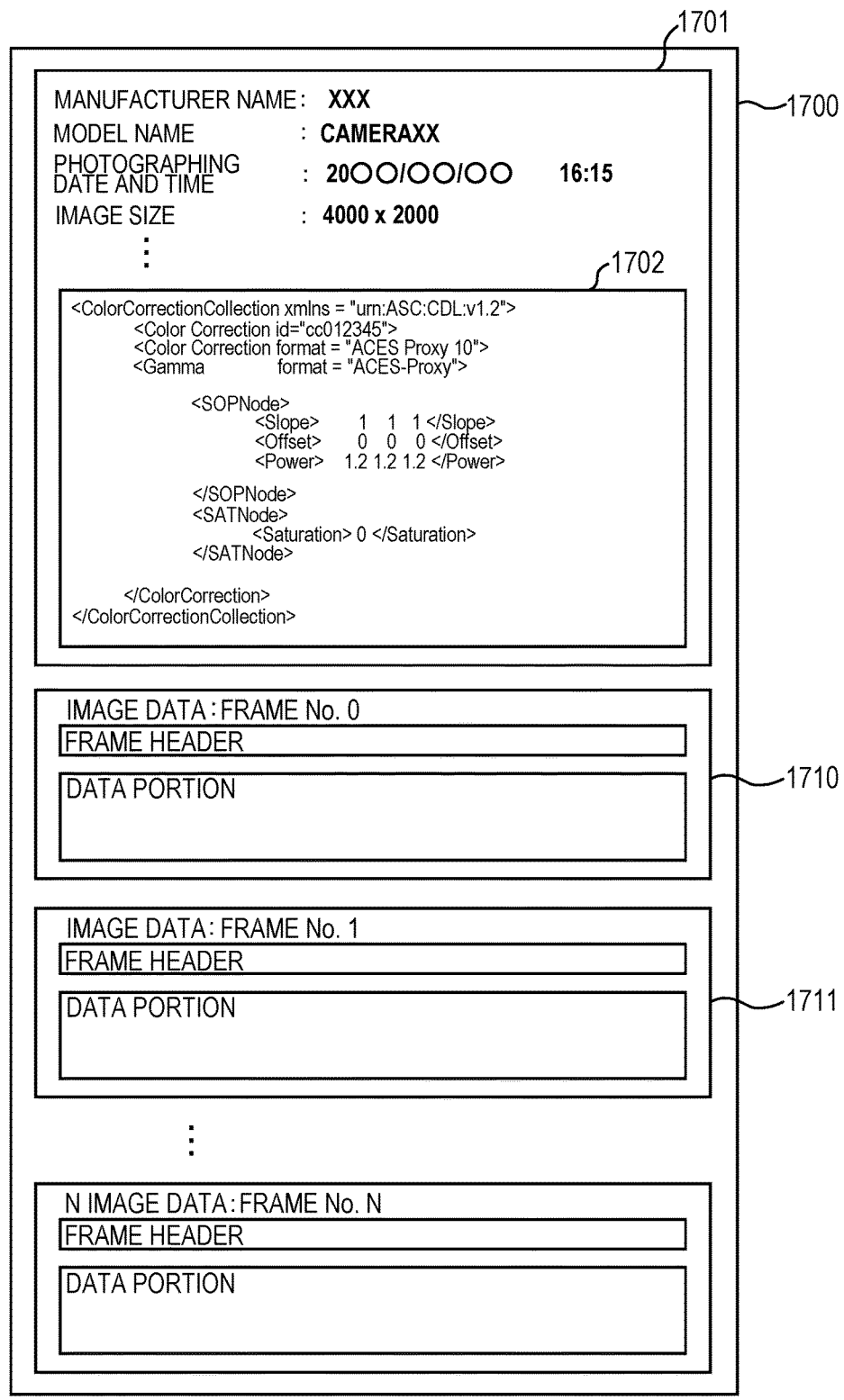
FIG. 17 is a diagram illustrating a file header of an image file.

In step S1406, the imaging apparatus 100 records the CDL file 1600 acquired in step S1404 in the file header of the picked up image file. FIG. 17 is a diagram illustrating an example of the file header of the image file.

FIG. 17 illustrates a file configuration of a clip recorded in the imaging apparatus 100. An image file 1700 indicates the entire image clip file. The image file 1700 includes a file header 1701 and image frame data 1710 and 1711. Color grading parameters 1702 are data of the CDL file 1600 acquired in step S1404. For the color grading parameters 1702, the parameters (CDL parameters) of the color grading processing are recorded in part of the file header 1701.

The color grading operation at imaging in the imaging apparatus 100 and the provisional color grading apparatus 300 has been described.

Next, an example of operation will be described, in which the substantial color grading apparatus 400 performs the substantial color grading processing to the image recorded in the imaging apparatus 100.

The schematic configuration of the substantial color grading apparatus 400 is the same as the schematic configuration of the provisional color grading apparatus 300 illustrated in FIG. 4, and the details will not be described here. In the substantial color grading apparatus 400, the configuration and the processing contents of the image processing unit 303 are different from those of the provisional color grading apparatus 300.

Figure 13:
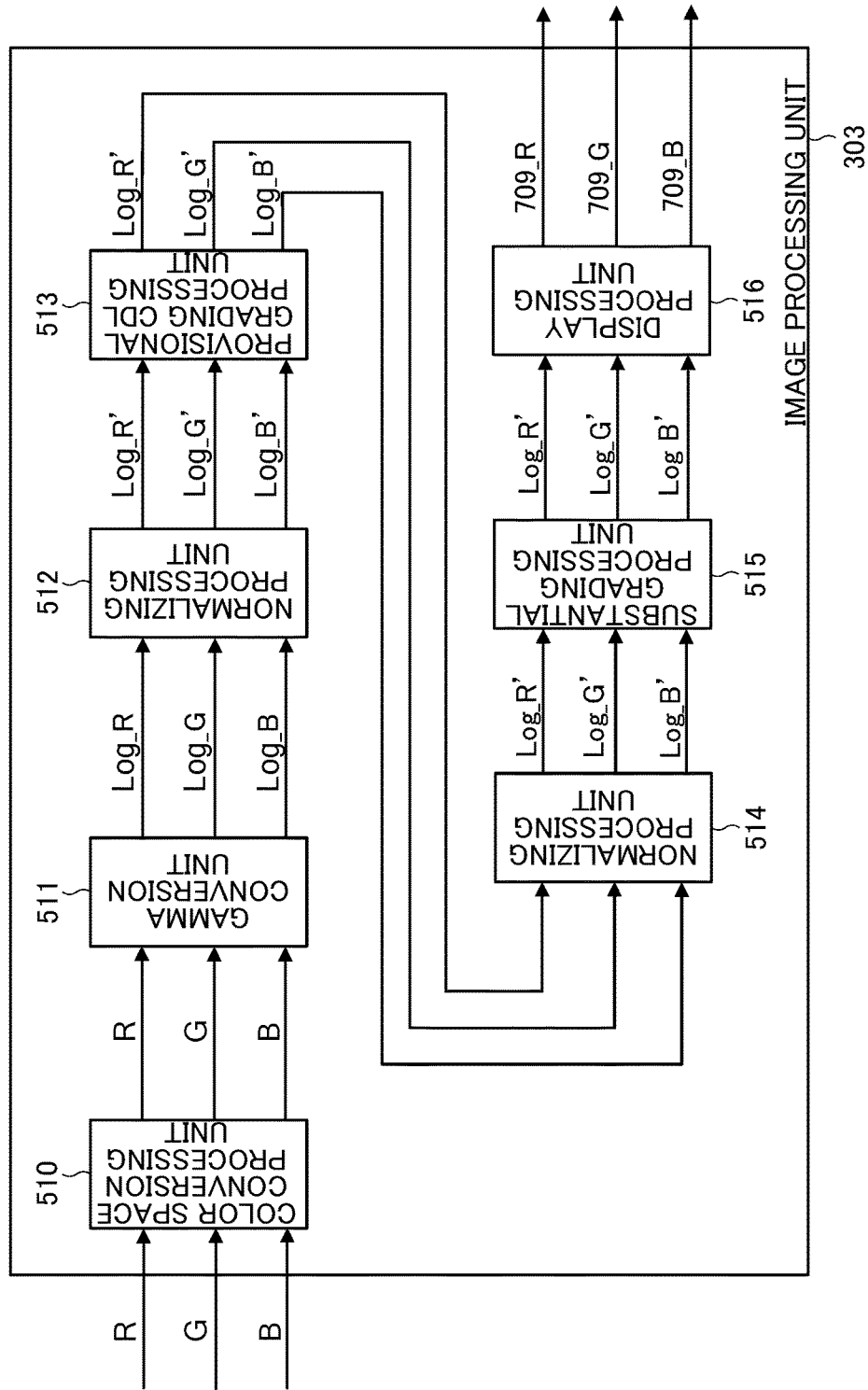
FIG. 13 is a diagram illustrating an image processing unit according to the present embodiment.

FIG. 13 is a diagram illustrating an example of a detailed configuration of the image processing unit 303 of the substantial color grading apparatus 400 according to the present embodiment.

In FIG. 13, the color space conversion processing unit 510 converts the color space of the input image signals (RGB signals) according to the conditions of the input format described later. The gamma conversion unit 511 performs shape conversion of the gamma for the image signals with converted color space according to the conditions of the input format described later. The normalizing processing unit 512 performs normalizing processing corresponding to the normalizing in the provisional color grading apparatus 300 to the image signals subjected to the shape conversion of the gamma. The provisional grading CDL processing unit 513 applies the provisional color grading processing (CDL processing) performed in the provisional color grading apparatus 300 to the image signals subjected to the normalizing processing to perform processing corresponding to the provisional color grading processing.

A normalizing processing unit 514 performs normalizing for substantial grading to the image signals subjected to the processing corresponding to the provisional color grading processing. A substantial grading processing unit 515 performs substantial color grading processing to the image signals subjected to the normalizing for substantial grading. A processing unit for displaying 516 performs gamma processing and color space conversion for display device according to the output device such as the monitor 201.

Control parameters are set in the processing units illustrated in FIG. 13 based on a flow chart described later, and various processing is executed.

Next, an example of operation by the system controlling unit 350 of the substantial color grading apparatus 400 for reading the image file to perform the substantial color grading will be described with reference to a flow chart of FIG. 18.

In step S1801, the system controlling unit 350 receives operation by the user through the operating unit 320 and selects the image file 1700 to be subjected to color grading. As described, the color grading parameters 1702 that are data of the CDL file 1600 are stored in the file header 1701 of the image file 1700.

In step S1802, the system controlling unit 350 acquires the CDL information that is the color grading parameters 702, from the file header 701 of the image file 1700. The system controlling unit 350 extracts the format information (gamma characteristics and color space) adopted in the provisional color grading processing from the acquired CDL information. In the present embodiment, an example of the parameter acquiring unit and the gamma characteristic acquiring unit is realized by the processing.

In step S1803, the system controlling unit 350 determines whether the gamma characteristics adopted in the provisional color grading processing and the format characteristics of the currently reading image file are the same based on the CDL information.

As a result of the determination, if the gamma characteristics adopted in the provisional color grading processing and the format characteristics of the currently reading image file are the same, steps S1804 and S1805 are skipped, and the process proceeds to step S1806 described later.

On the other hand, if the gamma characteristics adopted in the provisional color grading processing and the format characteristics of the currently reading image file are different, the process proceeds to step S1804.

In step S1804, the system controlling unit 350 determines the format (color space and gamma characteristics) to be processed in the substantial color grading apparatus 400. The gamma characteristics are determined so that the gamma is at least partially similar to or the same as the gamma adopted in the provisional color grading.

Figure 15A:
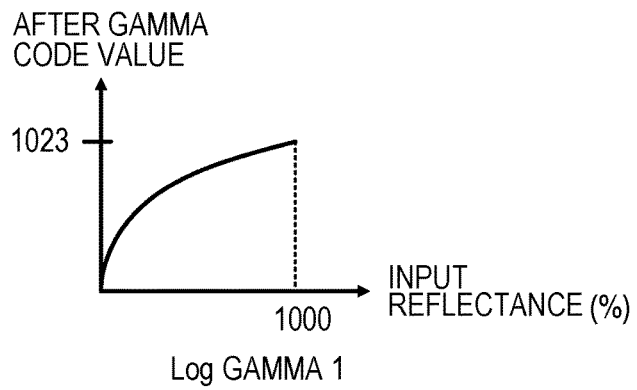
FIGS. 15A, 15B and 15C show ACES-Log.
Figure 15B:
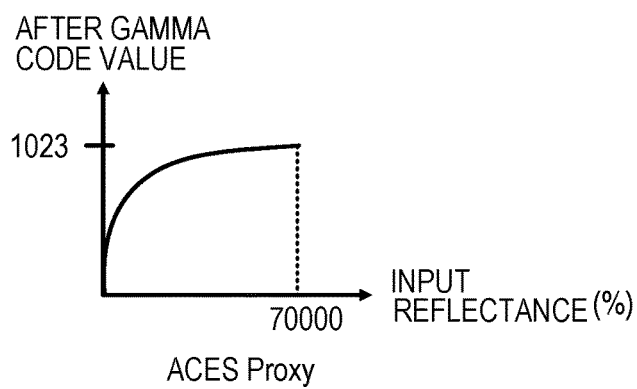
Figure 15C:
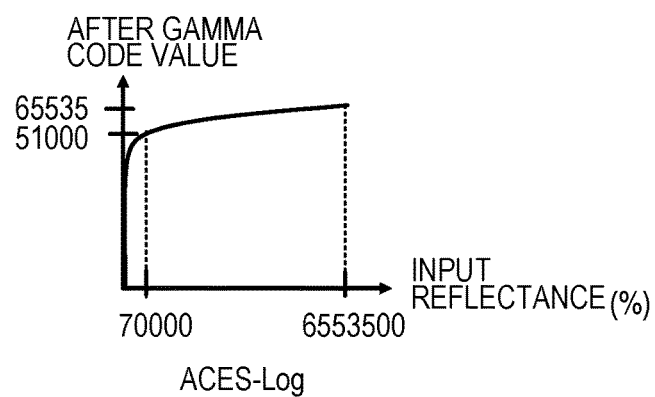

An example of a method of determining the gamma characteristics will be described with reference to FIG. 19. An example 1 of FIG. 19 indicates that the gamma characteristic adopted in the provisional color grading processing is ACES-Proxy (see color grading format of FIG. 19). In this case, ACES-Log partially similar to ACES-Proxy that is the gamma characteristic adopted in the provisional color grading processing is selected regardless of the gamma characteristics in the image file 1700 read in the substantial color grading apparatus 400. ACES-Log is illustrated in FIG. 15C, and the shape is substantially similar to ACES-Proxy up to about 70000% in input reflectance. As for the color space, the ACES color space is adopted in the provisional color grading apparatus 300, and therefore, the ACES color space is also adopted in the substantial color grading apparatus 400. In this way, whether the color space of the image signals input to the substantial color grading apparatus 400 and the color space adopted in the provisional color grading apparatus 300 are the same is also determined in step S1803.

Figure 18:
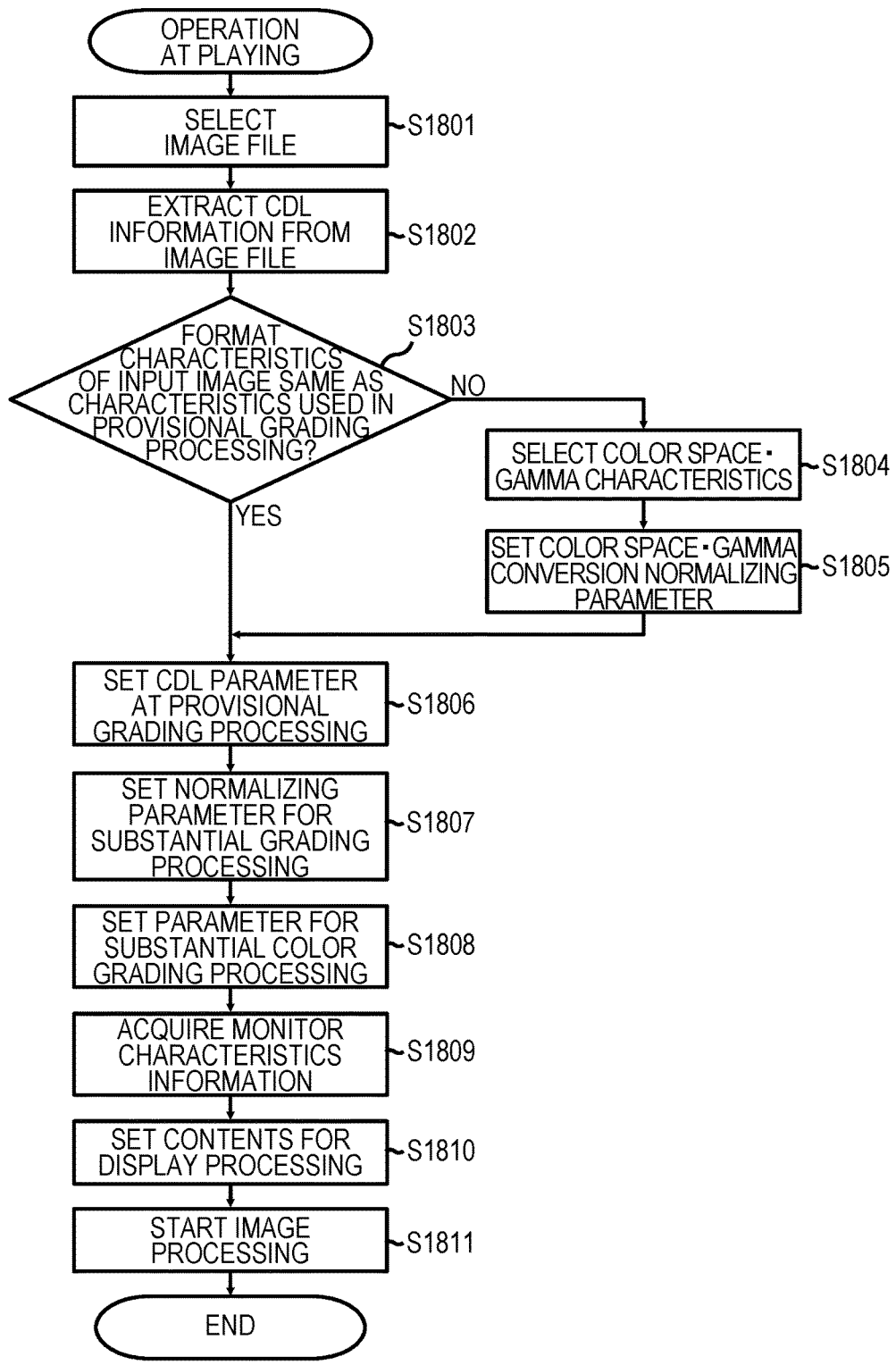
FIG. 18 is a flow chart of an operation by a system controlling unit.

Returning to the description of FIG. 18, in step S1805, the system controlling unit 350 sets, in the color space conversion processing unit 510 and the gamma conversion unit 511, parameters for conversion to the color space and the gamma characteristics determined in step S1804. In the example 1 of FIG. 19, parameters for converting the color space from the sRGB color space to the ACES color space are set in the color space conversion processing unit 510, and parameters for converting the log gamma 1 to ACES-Log are set in the gamma conversion unit 511. Normalizing parameters corresponding to the normalizing in the provisional color grading processing are set in the normalizing processing unit 512. Specifically, in the example 1 of FIG. 19, ACES-Proxy that is the gamma characteristic adopted in the provisional color grading apparatus 300 is normalized at the input reflectance of about 70000%. Therefore, ACES-Log is normalized at the input reflectance of 70000%, as in the normalizing in the provisional color grading processing. The input reflectance that serves as a reference for normalizing is recorded in advance in the non-volatile memory 323 of the substantial color grading apparatus 400 in association with the gamma characteristics at the provisional color grading processing, and the input reflectance that serves as a reference for the normalizing is determined by the format information.

Next, the case in which the gamma characteristics adopted in the provisional color grading processing and the format characteristics of the currently reading image file are the same in step S1803 will be described. In this case, the input format for the substantial color grading apparatus 400 is adopted as it is as illustrated in an example 2 of FIG. 19. Therefore, parameters for not performing any processing are set in the color space conversion processing unit 510 and the gamma conversion unit 511. The normalizing is performed in the normalizing processing unit 512 at the same input reflectance as in the provisional color grading processing. In the example 2 of FIG. 19, the normalizing is performed at the input reflectance of 1000%.

Returning to the description of FIG. 18, the system controlling unit 350 sets the CDL parameters generated at the provisional color grading processing (parameters of provisional color grading processing) in the provisional grading CDL processing unit 513 in step S1806.

In step S1807, the system controlling unit 350 sets, in the normalizing processing unit 514, normalizing parameters for performing the substantial color grading processing in the substantial color grading apparatus 400. The normalizing is performed by ACES-Log in the example 1 of FIG. 19, and thus the parameters for normalizing at a full range of ACES-Log (input reflectance 6553500%) are set. In the example 2 of FIG. 19, parameters for normalizing at a full range of the log gamma 1 (input reflectance 1000%) are set.

In step S1808, the system controlling unit 350 receives the input instruction of the user through the operating unit 320 to generate parameters (CDL parameters) for the substantial color grading processing and sets the parameters in the substantial grading processing unit 515.

In step S1809, the system controlling unit 350 acquires the characteristic information of the monitor 201 connected to the substantial color grading apparatus 400. The system controlling unit 350 may communicate with the monitor 201 to acquire the characteristic information of the monitor 201 or may receive operation of the user through the operating unit 320 to acquire the characteristic information of the monitor 201.

In step S1810, the system controlling unit 350 determines the contents of the processing by the processing unit for displaying 516 according to the characteristic information of the monitor 201 acquired in step S1809. For example, when the monitor 201 is a monitor for Rec.709 standard, the provisional grading CDL processing unit 513 performs gamma conversion or ODT processing (in the case of ACES) suitable for Rec.709 and outputs the result.

In step S1811, the system controlling unit 350 starts the operation of the read image file, for the image processing unit 303 of FIG. 5B.

As described, in the present embodiment, the provisional color grading apparatus 300 outputs and records the gamma characteristics adopted in the provisional color grading processing, in association with the parameters (CDL parameters) of the color grading processing. The substantial color grading apparatus 400 adopts the gamma characteristics partially similar to or the same as the gamma characteristics adopted in the provisional color grading processing. The read image signals are converted according to the same gamma characteristics as in the provisional color grading processing, and then the parameters of the provisional color grading processing are applied.

In this way, even if the gamma processed in the provisional color grading apparatus 300 and the input gamma of the substantial color grading apparatus 400 are different, the result of the provisional color grading processing can be re-produced in the substantial color grading apparatus 400. Therefore, the contents of the provisional color grading processing at imaging can be more correctly re-produced in the substantial color grading processing after imaging to prevent confusing the user regarding the result of the color grading processing.

In the example of the format described in the present embodiment, the information of the gamma characteristics adopted in the provisional color grading processing is recorded in the CDL file 800 for recording the parameters of the color grading processing. However, any method can be adopted as long as the parameters of the color grading processing and the information of the gamma characteristics adopted in the provisional color grading processing are recorded in association with one another. For example, the parameters of the color grading processing and the information of the gamma characteristics adopted in the provisional color grading processing may be recorded in separate files. In this case, for example, a method of writing a link to the information of the gamma characteristics adopted in the provisional color grading processing in the file of the parameters of the color grading processing can be adopted.

In the example described in the present embodiment, the provisional color grading apparatus 300 uses the gamma characteristics input from the imaging apparatus 100 as it is. However, the gamma characteristics may be converted in the provisional color grading apparatus 300. For example, it is assumed that the gamma characteristic of the image signals input to the provisional color grading apparatus 300 is the log gamma 1, and the color space is the sRGB color space. In this case, the image processing unit 303 in the provisional color grading apparatus 300 may convert the gamma characteristics and the color space of the input image signals into LogACES and ACES color space, respectively.

In this case, the information of the gamma characteristics actually adopted in the provisional color grading processing is recorded for the information of the gamma characteristics recorded in the file of the parameters of the color grading processing. When the color space is also changed, the information of the color space is recorded in the file of the parameters of the color grading processing in association with the information of the gamma characteristics.

In the example described in the present embodiment, the information of the gamma characteristics used in the provisional color grading processing is written by character string information for identifying the gamma characteristics. However, the method of writing the information of the gamma characteristics is not limited to this. For example, the information of the gamma characteristics may be in any form, such as an ID, a formula, and table data for identifying the gamma characteristics.

In the example described in the present embodiment, the provisional color grading apparatus 300 records the information of the gamma characteristics in the CDL file 1600. However, the parameters (CDL parameters) of the color grading processing and the information of the gamma characteristics may be associated with one another in the imaging apparatus 100. For example, the imaging apparatus 100 may record the information of the gamma characteristics of the camera output when the CDL file 1600 is received from the provisional color grading apparatus 300.

In the example described in the present embodiment, the CDL file 1600 is recorded as the information of the color grading. However, the record of the information of the color grading is not limited to the CDL file 1600. The information of the color grading may be in any form as long as the contents of the provisional color grading processing are transmitted to the substantial color grading apparatus 400.

For example, the processing by the color space conversion processing unit 510, the gamma conversion unit 511, the normalizing processing unit 512, and the provisional grading CDL processing unit 513 in the substantial color grading apparatus 400 may be integrated to generate an LUT (Look Up Table). In this case, the information of the color grading (contents of provisional grading processing) is recorded in the file of the LUT. In this case, the information of the gamma characteristics is added to the generated LUT file. In this case, the image processing unit 303 of the substantial color grading apparatus 400 includes an LUT processing unit in place of the color space conversion processing unit 510, the gamma conversion unit 511, the normalizing processing unit 512, and the provisional grading CDL processing unit 513. The LUT processing unit executes processing of LUT.

The above-described embodiments are only intended to illustrate examples for implementing the present invention and should not be construed as limiting the technical scope of the present invention. The present invention can be implemented in various forms without departing from the technical spirit and essential characteristics of the present invention.

According to the present invention, the contents of the image processing performed in the image processing apparatus can be re-produced in another image processing apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2013-269396, filed on Dec. 26, 2013 and No. 2013-269407, filed on Dec. 26, 2013, which are hereby incorporated by reference herein in their entirety.

The invention claimed is:

1. An image processing apparatus comprising:
one or more processors or circuits which function as:
an acquiring unit configured to acquire an image signal;
a setting unit configured to set an output format for outputting the image signal subjected to an image processing, wherein, as the output format, at least any one of gamma characteristics and color space of the image signal is defined;
a format information acquiring unit configured to acquire format information containing the at least any one of gamma characteristics and color space of the image signal, according to the output format set by the setting unit;
a normalizing reference acquiring unit configured to acquire a normalizing reference which is a reference value for normalizing the image signal, wherein the normalizing reference is determined based on the format information; and
a normalizing unit configured to normalize the image signal according to the normalizing reference;
an image processing unit configured to perform an image processing of the image signal normalized; and
an output unit configured to output a parameter used in the image processing and the normalizing reference correlated to each other.

2. The image processing apparatus according to claim 1, wherein
the normalizing reference acquiring unit converts the reference value for normalizing the image signal into a value independent of device, and determines the converted value as the normalizing reference.

3. The image processing apparatus according to claim 1, wherein
the output unit outputs the parameter and the normalizing reference as a same one file.

4. The image processing apparatus according to claim 1, wherein
the acquiring unit acquires the image signal being in an imaging by an external imaging apparatus,
the output unit outputs, to the external apparatus, the parameter and the normalizing reference correlated to each other, and
the parameter and the normalizing reference are information contained in a file of the image signal imaged and recorded by the external imaging apparatus.

5. The image processing apparatus according to claim 1, wherein
the image processing is a color grading processing to convert an appearance of the image.

6. An imaging apparatus comprising:
an imaging unit;
one or more processors or circuits which function as:
a parameter acquiring unit configured to acquire, from an external image processing apparatus, a parameter used in an image processing of an image signal in the external image processing apparatus;
a setting unit configured to set an output format for outputting the image signal subjected to an image processing, wherein, as the output format, at least any one of gamma characteristics and color space of the image signal is defined;
a format information acquiring unit configured to acquire format information containing the at least any one of gamma characteristics and color space of the image signal, according to the output format set by the setting unit; and
a normalizing reference acquiring unit configured to acquire a normalizing reference which is a reference value for normalizing the image signal, wherein the normalizing reference is determined based on the format information; and
a recording unit configured to record the image signal imaged in the imaging unit, the parameter and the normalizing reference correlated to each other.

7. The imaging apparatus according to claim 6, wherein
the parameter acquiring unit acquires, from the external image processing apparatus, the parameter used in the image processing of the image signal being imaged by the imaging unit.

8. The imaging apparatus according to claim 6, wherein
the recording unit records the parameter and the normalizing reference in the file of the image signal as metadata of the image signal.

9. The imaging apparatus according to claim 6, wherein
the normalizing reference acquiring unit acquires the normalizing reference from the external image processing apparatus.

10. The imaging apparatus according to claim 6, further comprising
a format information acquiring unit configured to acquire a format information containing at least any one of gamma characteristics and color space of the image signal, wherein
the normalizing reference acquiring unit determines the normalizing reference based on the format information.

11. The imaging apparatus according to claim 6, wherein
the normalizing reference acquiring unit converts the reference value for normalizing the image signal into a value independent of device, and determines the converted value as the normalizing reference.

12. The imaging apparatus according to claim 6, wherein
the image processing is a color grading processing to convert an appearance of the image.

13. An image processing method comprising:
acquiring an image signal;
setting an output format for outputting the image signal subjected to an image processing, wherein, as the output format, at least any one of gamma characteristics and color space of the image signal is defined;
acquiring format information containing the at least any one of gamma characteristics and color space of the image signal, according the output format set by the setting unit;
acquiring a normalizing reference which is a reference value for normalizing the image signal, wherein the normalizing reference is determined based on the format information;
normalizing the image signal according to the normalizing reference;
performing an image processing of the image signal normalized; and
outputting a parameter used in the image processing and the normalizing reference correlated to each other.

* * * * *